US012775130B2

(12) United States Patent
Kubo et al.

(10) Patent No.: US 12,775,130 B2
(45) Date of Patent: Oct. 27, 2026

(54) OPTICAL FILTER, IMAGING APPARATUS, AND OPTICAL FILTER MANUFACTURING METHOD

(71) Applicant: Nippon Sheet Glass Company, Limited, Tokyo (JP)

(72) Inventors: Yuichiro Kubo, Tokyo (JP); Katsuhide Shimmo, Kanagawa (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 470 days.

(21) Appl. No.: 18/249,014

(22) PCT Filed: Oct. 6, 2021

(86) PCT No.: PCT/JP2021/037053
§ 371 (c)(1),
(2) Date: Apr. 13, 2023

(87) PCT Pub. No.: WO2022/080217
PCT Pub. Date: Apr. 21, 2022

(65) Prior Publication Data

US 2023/0417967 A1 Dec. 28, 2023

(30) Foreign Application Priority Data

Oct. 16, 2020 (JP) ................................ 2020-174647

(51) Int. Cl.
*G02B 5/22* (2006.01)

(52) U.S. Cl.
CPC .................................... *G02B 5/223* (2013.01)

(58) Field of Classification Search
CPC . G02B 5/223; G02B 5/20; G02B 5/22; G02B 7/02
See application file for complete search history.

(56) References Cited

U.S. PATENT DOCUMENTS 5,812,226 A 9/1998 Izumi et al.
6,369,380 B1 4/2002 Hirai
2005/0079650 A1* 4/2005 Mancini .................. G03F 7/094 438/105
2005/0168127 A1* 8/2005 Shei ..................... C09K 11/592 313/486
(Continued)

FOREIGN PATENT DOCUMENTS

JP S639956 A * 1/1988
JP H08122769 A 5/1996
(Continued)

OTHER PUBLICATIONS

International Search Report and Written Opinion issued for International Patent Application No. PCT/JP2021/037053, Date of mailing: Nov. 22, 2021, 9 pages including English translation of Search Report.

*Primary Examiner* — Lucy P Chien
(74) *Attorney, Agent, or Firm* — HSML P.C.

(57) ABSTRACT

An optical filter 1 includes a frame 10 and a light-absorbing film 20. The frame 10 has a through hole 12. The light-absorbing film 20 is disposed to close the through hole 12 and includes a light-absorbing compound. An average Young's modulus of the light-absorbing film 20 measured by continuous stiffness measurement is 2.5 GPa or less.

10 Claims, 12 Drawing Sheets

(56) References Cited

U.S. PATENT DOCUMENTS

2006/0001005 A1* 1/2006 Kishimoto ............ C03C 4/0071 252/301.33
2006/0289787 A1* 12/2006 Ohman ............. B01L 3/502746 422/82.08
2009/0305049 A1 12/2009 Kobuchi et al.
2010/0327185 A1* 12/2010 Kindler ..................... G09F 9/30 156/60
2012/0172485 A1 7/2012 Sun et al.
2013/0129375 A1* 5/2013 Yamasaki .......... G03G 21/1619 399/103
2016/0163750 A1 6/2016 Umali et al.
2017/0192256 A1 7/2017 Fujinaka
2017/0341186 A1* 11/2017 Hakuta ................ G10K 11/162
2020/0158930 A1 5/2020 Kubo
2020/0198298 A1 6/2020 Imanishi et al.
2020/0271848 A1 8/2020 Yamashina et al.
2022/0057556 A1 2/2022 Kubo et al.

FOREIGN PATENT DOCUMENTS

JP H10111427 A 4/1998
JP 2009053620 A 3/2009
JP 2009294445 A 12/2009
JP 2015174270 A 10/2015
JP 6232161 B1 11/2017
JP 6368444 B1 8/2018
JP 2019028162 A 2/2019
JP 2019-81896 A 5/2019
JP 6543746 B1 7/2019
JP 2020140829 A 9/2020
WO 2016158680 A1 10/2016
WO 2019044758 A1 3/2019
WO 2020054400 A1 3/2020

* cited by examiner

OPTICAL FILTER, IMAGING APPARATUS, AND OPTICAL FILTER MANUFACTURING METHOD

TECHNICAL FIELD

The present invention relates to an optical filter, an imaging apparatus, and an optical filter manufacturing method.

BACKGROUND ART

In imaging apparatuses employing a solid-state image sensing device such as a charge coupled device (CCD) or a complementary metal oxide semiconductor (CMOS), any of various optical filters is disposed ahead of the solid-state image sensing device in order to obtain an image with good color reproduction. Solid-state image sensing devices generally have spectral sensitivity over a wide wavelength range extending from the ultraviolet to infrared regions. On the other hand, the visual sensitivity of humans lies solely in the visible region. Thus, a technique is known in which an optical filter blocking a portion of infrared light or ultraviolet light is disposed ahead of a solid-state image sensing device in an imaging apparatus. The technique allows the spectral sensitivity of the solid-state image sensing device to approximate to the visual sensitivity of humans.

It has been common for such an optical filter to block infrared light or ultraviolet light by means of light reflection by a multilayer dielectric film. In recent years, optical filters including a film containing a light-absorbing compound have been attracting attention. The transmittance properties of optical filters including a film containing a light-absorbing compound are unlikely to be dependent on the incident angle, and this makes it possible to obtain favorable images with less color change even when light is obliquely incident on the optical filters in imaging apparatuses. Good backlit or nightscape images are more likely to be obtained using light-absorbing optical filters not including a light-reflecting film because such optical filters can reduce occurrence of ghosting and flare caused by multiple reflection in the light-reflecting film. Moreover, optical filters including a light-absorber-including film are advantageous also in terms of size reduction and thickness reduction of imaging apparatuses.

Light-absorbing compounds made of a phosphonic acid and copper ion are known as light-absorbing compounds for such use. For example, Patent Literature 1 describes an optical filter including a UV-IR-absorbing layer capable of absorbing infrared light and ultraviolet light. The UV-IR-absorbing layer includes a UV-IR absorber made of a phosphonic acid and copper ion. Patent Literature 2 describes a method for manufacturing an optical filter including a light-absorbing layer including a light-absorbing compound formed by a phosphonic acid and copper ion. According to the manufacturing method, a coating film is formed on a substrate having a surface including an organic fluorine compound and is then cured to form the light-absorbing layer. Thereafter, the light-absorbing layer is separated from the substrate to obtain the optical filter.

CITATION LIST

Patent Literature

Patent Literature 1: JP 6232161 B1
Patent Literature 2: JP 6543746 B1

SUMMARY OF INVENTION

Technical Problem

Patent Literatures 1 and 2 do not discuss an article including a frame to which a light-absorbing film is attached. Therefore, the present disclosure provides an optical filter including a frame and a light-absorbing film and capable of exhibiting favorable resistance to a variation, such as a temperature variation, in an environmental condition.

Solution to Problem

The present invention provides an optical filter including:

a frame having a through hole; and a light-absorbing film disposed to close the through hole, the light-absorbing film including a light-absorbing compound, wherein an average Young's modulus of the light-absorbing film measured by continuous stiffness measurement is 2.5 GPa or less.

The present invention also provides an imaging apparatus including:

an imaging device;

a lens configured to allow transmission of light from a subject and collect light to the imaging device; and the optical filter above.

The present invention also provides an optical filter manufacturing method, including:

supplying a light-absorbing composition including a light-absorbing compound to close a through hole of a frame; and curing the light-absorbing composition to form a light-absorbing film, wherein an average Young's modulus of the light-absorbing film measured by continuous stiffness measurement is 2.5 GPa or less.

Advantageous Effects of Invention

The above optical filter can exhibit favorable resistance to a variation, such as a temperature variation, in an environmental condition.

DESCRIPTION OF EMBODIMENTS

The optical filters described in Patent Literatures 1 and 2 have the shape of a sheet or a film. This means that these optical filters need to be cut into a desired size beforehand, for example, in the case where the optical filters will be mounted in camera modules. In this case, it is conceivable that the cut optical filters are adhered to given frames to produce frame-attached filters and the frame-attached filters are adhered to and integrated with camera modules. Such cutting and adhesion of an optical filter need a large-scale facility or complicated and delicate work. Moreover, such a process of producing a frame-attached filter is not likely to increase a yield rate and is prone to a productivity problem. In particular, when a variation, such as a temperature variation, of an environment of a frame-attached filter occurs, there is likely to be a gap between an amount of expansion of the optical filter and an amount of expansion of the frame due to inconsistency between the material of the frame and the material of the optical filter. This may cause the optical filter to break or to be detached from the frame.

The present inventors therefore made intensive studies on a configuration including a frame and a light-absorbing film and capable of exhibiting favorable resistance to a variation, such as a temperature variation, in an environmental condition. After much trial and error, the present inventors have finally invented the optical filter according to the present invention.

Hereinafter, embodiments of the present invention will be described. The following description is directed to some examples of the present invention, and the present invention is not limited by these examples.

Figure 1A:
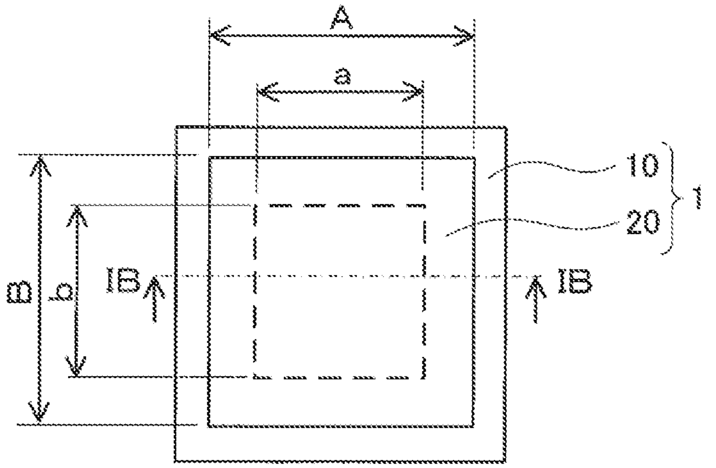
FIG. 1A is a plan view of an example of an optical filter according to the present invention.
Figure 1B:
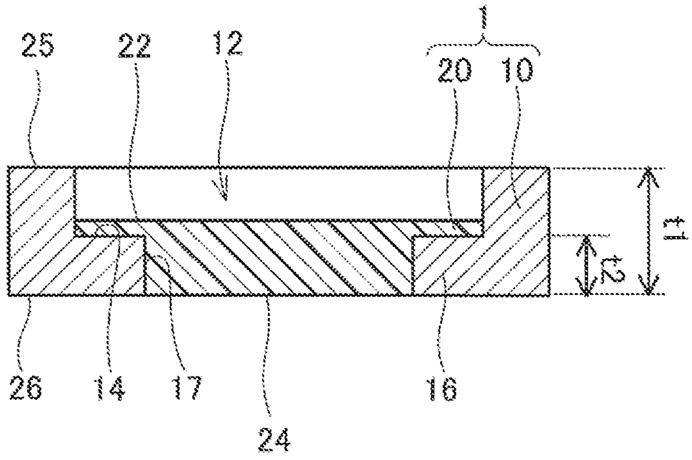
FIG. 1B is a cross-sectional view of the optical filter along a section line which is a line IB-IB shown in FIG. 1A.

FIG. 1A is a plan view of an example of the optical filter according to the present invention, and FIG. 1B is a cross-sectional view of the optical filter along a plane through a line IB-IB shown in FIG. 1A, the plane being perpendicular to the page.

As shown in FIGS. 1A and 1B, an optical filter 1 includes a frame 10 and a light-absorbing film 20. The frame 10 has a through hole 12. The light-absorbing film 20 is disposed to close the through hole 12 and includes a light-absorbing compound. An average Young's modulus of the light-absorbing film 20 measured by continuous stiffness measurement is 2.5 GPa or less. Thus, the optical filter 1 can exhibit favorable resistance to an environmental variation, such as a temperature variation. Because of this, the light-absorbing film 20 in the optical filter 1 is unlikely to be broken and be detached from the frame 10 by a temperature variation in an environment of the optical filter 1. The average Young's modulus of the light-absorbing film 20 can be determined according to a method described in EXAMPLES. For details of nanoindentation (continuous stiffness measurement), WO 2019/044758 A1 and JP 2015-174270 A can be referred to.

The average Young's modulus of the light-absorbing film 20 is desirably 2.4 GPa or less, and more desirably 2.2 GPa or less. The Young's modulus of the light-absorbing film 20 is, for example, 0.1 GPa or more and may be 0.4 GPa or more.

An average hardness of the light-absorbing film 20 measured by continuous stiffness measurement is not limited to a particular value. The average hardness of the light-absorbing film 20 is, for example, 0.06 GPa or less. The average hardness may be 0.005 GPa to 0.06 GPa.

The material of the frame 10 is not limited to a particular material. The material of the frame 10 may be a metal material such as stainless steel, iron, or aluminum, a resin, a composite material, or a ceramic. The metal material may be an alloy such as an aluminum alloy. Examples of the resin include nylon, polyphenylene sulfide (PPS), polyethylene terephthalate (PET), polyvinyl chloride resin (PVC), an acrylic resin, acrylonitrile-butadiene-styrene resin (ABS), polyethylene, polyester, polypropylene, polyolefin, polyvinyl alcohol (PVA), polyvinyl butyral (PVB), polyimides, and an epoxy resin. The composite material is, for example, a material including a filler or a fiber dispersed in a matrix resin. Examples of the ceramic include alumina or zirconia.

An average coefficient of linear expansion of the material of the frame 10 in a range of 0° C. to 60° C. is not limited to a particular range. The average coefficient of linear expansion thereof is, for example, $0.2\times10^{-5}$ [/° C.] to $25\times10^{-5}$ [/° C.]. In this case, the optical filter 1 can more reliably exhibit favorable resistance to an environmental variation, such as a temperature variation. The average coefficient of linear expansion of the material of the frame 10 in the range of 0° C. to 60° C. is desirably $1.0\times10^{-5}$ [/° C.] to $25\times10^{-5}$ [/° C.], and more desirably $4.0\times10^{-5}$ [/° C.] to $16\times10^{-5}$ [/° C.].

In the case where the material of the frame 10 is the metal material, the average coefficient of linear expansion of the metal material in the temperature range of 0° C. to 60° C. is, for example, $1.0\times10^{-5}$ [/° C.] to $3.0\times10^{-5}$ [/° C.] regardless of the kind of the metal material. The average coefficient of linear expansion of the metal material in the temperature range of 0° C. to 60° C. is $2.3\times10^{-5}$ [/° C.] to $2.8\times10^{-5}$ [/° C.] in the case where the metal material is an aluminum or an aluminum alloy such as duralumin, $1.0\times10^{-5}$ [/° C.] to $1.3\times10^{-5}$ [/° C.] in the case where the metal material is iron or steel, and $1.0\times10^{-5}$ [/° C.] to $1.8\times10^{-5}$ [/° C.] in the case where the metal material is stainless steel. The average coefficient of linear expansion of a metal frame in a given temperature range can be measured according to Japanese Industrial Standards (JIS) R 3251-1995.

In the case where the material of the frame 10 is the resin, the average coefficient of linear expansion in the temperature range of 0° C. to 60° C. is, for example, $1.0\times10^{-5}$ [/° C.] to $25\times10^{-5}$ [/° C.]. The average coefficient of linear expansion of the resin in the temperature range of 0° C. to 60° C. is $10\times10^{-5}$ [/° C.] to $22\times10^{-5}$ [/° C.] in the case where the resin is polyethylene (PE), $5\times10^{-5}$ [/° C.] to $11\times10^{-5}$ [/° C.] in the case where the resin is polypropylene (PP), $6\times10^{-5}$ [/° C.] to $13\times10^{-5}$ [/° C.] in the case where the resin is acrylonitrile-butadiene-styrene (ABS), $5\times10^{-5}$ [/° C.] to $10\times10^{-5}$ [/° C.] in the case where the resin is polymethyl methacrylate (PMMA), $5\times10^{-5}$ [/° C.] to $15\times10^{-5}$ [/° C.] in the case where the resin is a polyamide (PA), $4\times10^{-5}$ [/° C.] to $7\times10^{-5}$ [/° C.] in the case where the resin is an epoxy resin (EP), $3.6\times10^{-5}$ [/° C.] to $5\times10^{-5}$ [/° C.] in the case where the resin is polyether ether ketone (PEEK), $4.2\times10^{-5}$ [/° C.] to $5.9\times10^{-5}$ [/° C.] in the case where the resin is polyetherimide (PEI), $5\times10^{-5}$ [/° C.] to $7\times10^{-5}$ [/° C.] in the case where the resin is polyethylene terephthalate (PET), and $4\times10^{-5}$ [/° C.] to $6\times10^{-5}$ [/° C.] in the case where the resin is polyphenylene sulfide (PPS). The frame 10 may be formed of any of the above engineering plastics. The average coefficient of thermal expansion of the frame in the temperature range of 0° C. to 60° C. may be $3.5\times10^{-5}$ [/° C.] to $15\times10^{-5}$ [/° C.]. The average coefficient of linear expansion of the resin frame in the given temperature range can be measured according to JIS R 3251-1995.

The material of the frame 10 may be the ceramic, if needed. The average coefficient of linear expansion of the ceramic in the temperature range of 0° C. to 60° C. is $0.55\times10^{-5}$ [/° C.] to $0.7\times10^{-5}$ [/° C.] in the case where the ceramic is $Al_2O_3$ (alumina), $0.7\times10^{-5}$ [/° C.] to $0.8\times10^{-5}$ [/° C.] in the case where the ceramic is $ZrO_2$ (zirconia), and $0.28\times10^{-5}$ [/° C.] to $0.3\times10^{-5}$ [/° C.] in the case where the ceramic is SiC (silicon carbide). The average coefficient of linear expansion of the ceramic frame in the given temperature range can be measured according to JIS R 3251-1995.

The method for measuring the average coefficient of linear expansion of the frame 10 is not limited to a particular method. The average coefficient of linear expansion of the frame 10 can be measured, for example, according to JIS R 3251-1995 using a laser thermal expansion measurement system LIX-2L manufactured by ADVANCE RIKO, Inc. In this case, a measurement sample can be produced by seizing the frame at two ends thereof with a pair of quartz chips. The average coefficient of thermal expansion of the frame in the temperature range of 0° C. to 60° C. can be determined by filling an environment of the measurement sample with a low-pressure high-purity He gas and measuring a lengthwise variation of the sample by a Michelson optical laser interferometer in the environment where the temperature is varying. In this case, a temperature increase rate is set, for example, at 2° C./min. Incidentally, the diameter of the measurement sample seized by the quartz chips is, for example, 3 mm to 6 mm, and the length of the sample is, for example, 10 mm to 15 mm.

A dimension of the frame 10 in a thickness direction of the light-absorbing film 20 is not limited to a particular value. The dimension is, for example, 0.2 mm to 2 mm.

The number of the through holes 12 in the frame 10 is not limited to a particular value. The number of the through holes 12 in the frame 10 may be 1, or may be 2 or more.

The size and shape of the through hole 12 in plan view of the optical filter 1 are not limited to particular aspects. For example, when the optical filter 1 is used in conjunction with an imaging device, the size of the through hole 12 in plan view of the optical filter 1 can be determined depending on the size of the imaging device or that of an image circle.

The shape of the through hole 12 in plan view of the optical filter 1 may be, for example, a circle, an approximate circle, an ellipse, an approximate ellipse, a triangle, a quadrilateral such as a regular square, an oblong, or a rhombus, or another polygon such as a pentagon or a hexagon. For example, when the optical filter 1 is used in conjunction with an imaging device, the shape of the through hole 12 in plan view of the optical filter 1 can be adjusted to conform to the shape of the imaging device.

As shown in FIG. 1B, the frame 10 has a first face 14. The first face 14 is in contact with the through hole 12 and extends along a plane parallel to a principal surface of the light-absorbing film 20. The first face 14 is, for example, in a ring shape.

The frame 10 includes, for example, at least one selected from the group consisting of a protruding portion in contact with the through hole 12 and a recessed portion in contact with the through hole 12. As shown in FIG. 1B, the frame 10 includes, for example, a protruding portion 16 in contact with the through hole 12. The protruding portion 16 protrudes toward a center of the through hole 12 in a direction parallel to the principal surface of the light-absorbing film 20. For example, an end face of the protruding portion 16 in the thickness direction of the light-absorbing film 20 forms the first face 14. For example, one end of the protruding portion 16 in the thickness direction of the light-absorbing film 20 and one end of the frame 10 in the thickness direction of the light-absorbing film 20 lie in the same plane.

It should be noted that when an object is a plate-shaped body, a principal surface of the object refers to a main face, which is a face having a larger area than other faces, and the face is called a principal surface.

In the frame 10, the through hole 12 is formed of a prismatic space having a volume of $A\times B\times(t1-t2)$ and a prismatic space having a volume of $a\times b\times t2$ connected to each other. When the shape of the through hole 12 in plan view is a regular square, A=B and a=b are satisfied. The symbol t1 refers to a dimension of the frame 10 in the thickness direction of the light-absorbing film 20, and t2 refers to a distance between the one end of the frame 10 and the first face 14 in the thickness direction of the light-absorbing film 20. Each of A and B is, for example, 5 to 30 mm, and each of a and b is, for example, 3 to 25 mm. The dimension t1 is, for example, 0.2 to 2 mm, and may be 0.2 to 1.5 mm or 0.3 to 0.9 mm. The distance t2 is, for example, 0.1 to 0.5 mm, and may be 0.1 to 0.25 mm.

A ratio (a value obtained by dividing the thickness of the light-absorbing film 20 by t1) of the thickness of the light-absorbing film 20 to t1 is not limited to a particular value. The ratio may be 0.6 or more, or may be 1 or more. The ratio of the thickness of the light-absorbing film 20 to t1 may be 2 or less, or may be 1.5 or less. Moreover, the ratio of the thickness of the light-absorbing film 20 to t1 may be 0.3 to 0.6, or even 0.39 to 0.44.

A ratio (a value obtained by dividing the thickness of the light-absorbing film 20 by t2) of the thickness of the light-absorbing film 20 to t2 may be more than 1 and 2 or less, 1.2 to 1.6, or even 1.3 to 1.46. When the thickness of the light-absorbing film 20 and t2 satisfy this relation, a contact area of the light-absorbing film 20 in contact with an inner face defining the through hole 12 can be larger and the adhesiveness of the light-absorbing film 20 to the frame 10 can be increased.

It should be noted that FIG. 1B is a (cross-sectional) view showing one example of the optical filter 1 according to the present invention. An example of the optical filter 1 according to the present invention will be described in more details using FIG. 1B. In FIG. 1B, the frame 10 is in the shape of a flat plate having a first end face 25 and a second end face 26 in a thickness direction of the frame 10. The first end face 25 is an upper end face, while the second end face 26 is a lower end face. The first end face 25 and the second end face 26 are each a flat face. The through hole 12 penetrates the frame 10 in the thickness direction of the frame 10. The thickness of the frame 10 is t1. The through hole 12 includes the protruding portion 16 protruding toward an inside of the through hole 12. The protruding portion 16 includes the first face 14 and a face 17. The first face 14 is a face substantially parallel to the second end face 26. The face 17 is a face perpendicular to the second end face 26 and the first face 14. A length of the frame 10 in the thickness direction of the frame 10 between the second end face 26 and the first face 14 is t2. The light-absorbing film 20 is provided inside the through hole 12. The light-absorbing film 20 is in the shape of a flat plate having a first principal surface 22 and a second principal surface 24 parallel to each other and apart from each other in the thickness direction of the light-absorbing film 20. The first principal surface 22 is an upper principal surface, while the second principal surface 24 is a lower principal surface. The first principal surface 22 and the second principal surface 24 are each a flat face. The second principal surface 24 of the light-absorbing film 20 is substantially flush with the second end face 26 of the frame 10. Being flush means a state where two or more faces are joined at the same level with no step therebetween. The thickness of the light-absorbing film 20 is a length of the light-absorbing film 20 in the thickness direction of the light-absorbing film 20 between the first principal surface 22 and the second principal surface 24. Additionally, the first principal surface 22 of the light-absorbing film 20 is closer to the first end face 25 than the first face 14 of the frame 10 is, and the thickness of the light-absorbing film 20 is greater than the length t2. Moreover, the light-absorbing film 20 is in contact with two faces, namely, the face 17 and the first face 14 forming the protruding portion 16.

Regardless of the specific configuration of the above example of the optical filter according to the present invention, when there is a protruding portion or a recessed portion inside the through hole where the light-absorbing film is disposed, the light-absorbing film may be in contact with a portion of or the whole of the protruding portion or the recessed portion. Alternately, the light-absorbing film may be in contact with at least two of faces forming the protruding portion or the recessed portion.

A surface color of the frame 10 is not limited to a particular color. A portion of the frame 10 in contact with the through hole 12 is, for example, black. The surface color of the frame 10 as a whole may be black. In this case, for example, re-reflection of light by the frame 10 can be reduced when the optical filter 1 is included in an imaging apparatus. The frame 10 may be colored with a color capable of reducing re-reflection of light.

The surface of the frame 10 may be a mat surface with reduced gloss, or may have fine asperities so as to reflect light diffusely. In these cases, light re-reflected on the surface of the frame 10 can be diffused. This makes it easy to reduce a ghost or flare resulting from direct reflection of light when the optical filter 1 is used in an imaging apparatus.

Figure 2A:
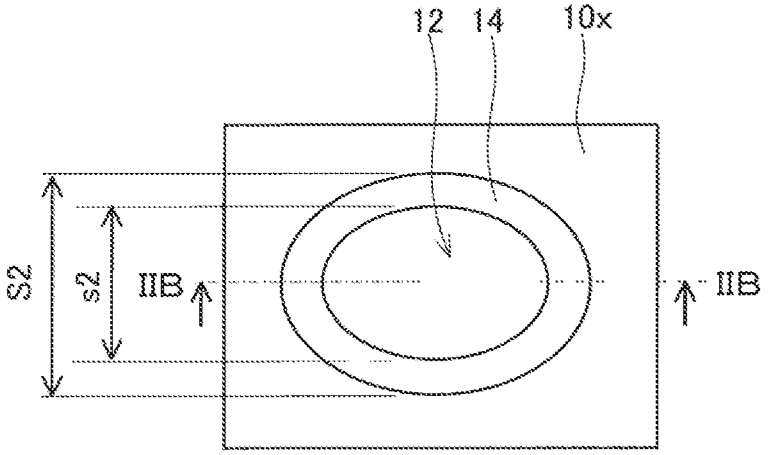
FIG. 2A is a plan view of another example of a frame of the optical filter according to the present invention.
Figure 2B:
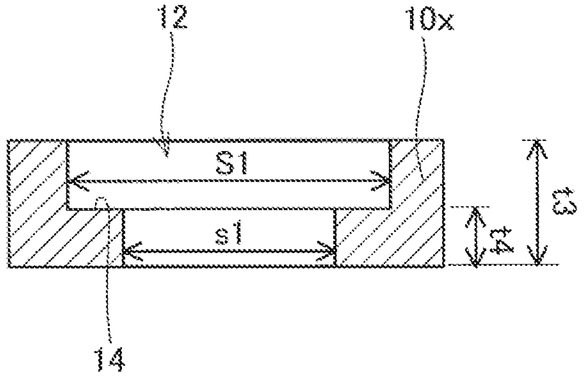
FIG. 2B is a cross-sectional view of the frame along a section line which is a line IIB-IIB shown in FIG. 2A.

The frame 10 may be modified to a frame 10*x* shown in FIGS. 2A and 2B. The frame 10*x* is configured in the same manner as the frame 10, unless otherwise described. The components of the frame 10*x* that are the same as or correspond to the components of the frame 10 are denoted by the same reference characters. The shape of the through hole 12 in plan view of the frame 10*x* is an ellipse. In the frame 10*x*, the through hole 12 is formed of an elliptic cylindrical space having a volume of $\pi(S1/2)\times(S2/2)\times(t3-t4)$ and an elliptic cylindrical space having a volume of $\pi(s1/2)\times(s2/2)\times t4$ connected to each other. Each of S1 and s1 is a length of the major axis of the ellipse, and each of S2 and s2 is a length of the minor axis of the ellipse. When the shape of the through hole 12 in plan view is a circle, S1=S2 and s1=s2 are satisfied. The symbol t3 refers to a dimension of the frame 10*x* in the thickness direction of the light-absorbing film 20, and t4 refers to a distance between the one end of the frame 10*x* and the first face 14 in the thickness direction of the light-absorbing film 20. Each of S1 and S2 is, for example, 5 to 30 mm, and each of s1 and s2 is, for example, 3 to 25 mm. The dimension t3 is, for example, 0.2 to 2 mm, and may be 0.2 to 1.5 mm or 0.3 to 0.9 mm. The distance t4 is, for example, 0.1 to 0.5 mm, and may be 0.1 to 0.25 mm.

A ratio (a value obtained by dividing the thickness of the light-absorbing film 20 by t3) of the thickness of the light-absorbing film 20 to t3 is not limited to a particular value. The ratio may be 0.6 or more, or may be 1 or more. The ratio of the thickness of the light-absorbing film 20 to t3 may be 2 or less, or 1.5 or less. The ratio of the thickness of the light-absorbing film 20 to t3 may be 0.3 to 0.6, or even 0.39 to 0.44.

A ratio (a value obtained by dividing the thickness of the light-absorbing film 20 by t4) of the thickness of the light-absorbing film 20 to t4 is more than 1. The ratio may be 2 or less, 1.2 to 1.6, or even 1.3 to 1.46. When the thickness of the light-absorbing film 20 and t4 satisfy this relation, a contact area of the light-absorbing film 20 in contact with the inner face defining the through hole 12 can be larger and the adhesiveness of the light-absorbing film 20 to the frame 10*x* can be increased.

The frame 10 is not limited to a particular form as long as the frame 10 has the through hole 12. The frame 10 may be modified, for example, to frames 10*a* to 10*i* shown in FIGS. 3A to 3I. The frames 10*a* to 10*i* are configured in the same manner as the frame 10, unless otherwise described. The components of the frames 10*a* to 10*i* that are the same as or correspond to the components of the frame 10 are denoted by the same reference characters. FIGS. 3A to 3I respectively show cross-sections of the frames 10*a* to 10*i*, the cross-sections each being along a plane including an axis of the through hole 12, the plane being parallel to the axis.

Figure 3A:
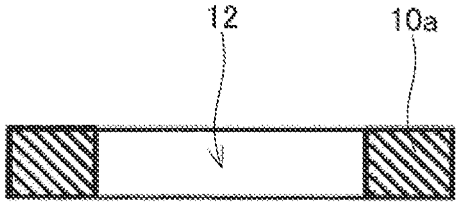
FIG. 3A is a cross-sectional view of yet another example of the frame of the optical filter according to the present invention.
Figure 3B:
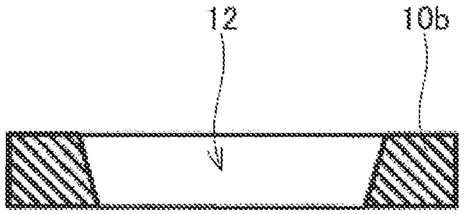
FIG. 3B is a cross-sectional view of yet another example of the frame of the optical filter according to the present invention.
Figure 3C:
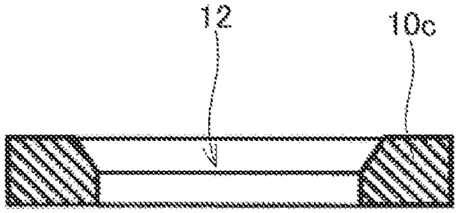
FIG. 3C is a cross-sectional view of yet another example of the frame of the optical filter according to the present invention.

In the frame 10*a* shown in FIG. 3A, the through hole 12 is defined by an inner face extending in a direction perpendicular to the principal surfaces of the light-absorbing film 20 (not illustrated). In the frame 10*b* shown in FIG. 3B, the through hole 12 is formed as a tapered hole. In the frame 10*c* shown in FIG. 3C, the through hole 12 includes a portion formed as a tapered hole and a portion defined by the inner face extending in the direction perpendicular to the principal surfaces of the light-absorbing film 20. The frame 10*d* shown in FIG. 3D and the frame 10*e* shown in FIG. 3E each include the protruding portion 16 in contact with the through hole 12. The protruding portion 16 is provided in a ring shape around the through hole 12. The protruding portion 16 of the frame 10*d* has, for example, a pair of sides parallel to the principal surfaces of the light-absorbing film 20 and an end face connecting the sides. For example, one of the pair of the sides of the protruding portion 16 forms the first face 14. The protruding portion 16 of the frame 10*e* has a tapered shape.

Figure 3D:
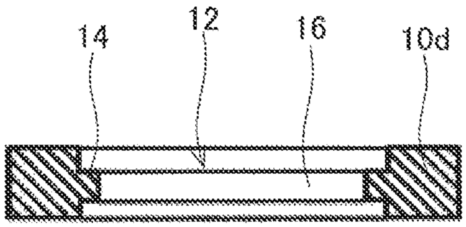
FIG. 3D is a cross-sectional view of yet another example of the frame of the optical filter according to the present invention.
Figure 3E:
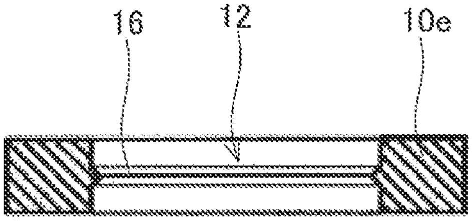
FIG. 3E is a cross-sectional view of yet another example of the frame of the optical filter according to the present invention.
Figure 3F:
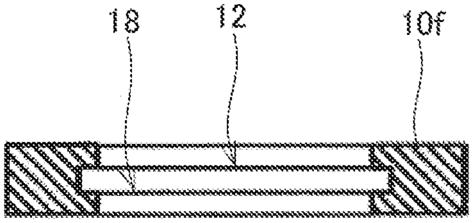
FIG. 3F is a cross-sectional view of yet another example of the frame of the optical filter according to the present invention.
Figure 3G:
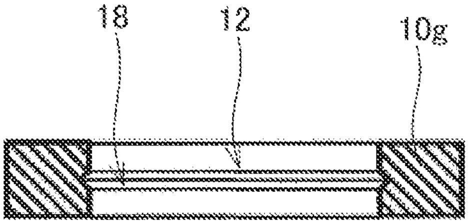
FIG. 3G is a cross-sectional view of yet another example of the frame of the optical filter according to the present invention.

The frame 10*f* shown in FIG. 3F and the frame 10*g* shown in FIG. 3G each include a recessed portion 18 in contact with the through hole 12. The recessed portion 18 is in a ring shape, and is included in a portion of the through hole 12. The recessed portion 18 of the frame 10*f* is, for example, parallel to the principal surfaces of the light-absorbing film 20, and has a pair of sides facing each other. One of the pair of the sides may be the first face 14. The recessed portion 18 of the frame 10*g* forms a wedge-shaped groove.

Figure 3H:
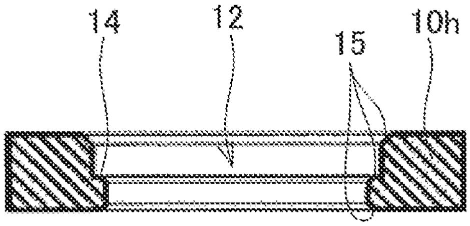
FIG. 3H is a cross-sectional view of yet another example of the frame of the optical filter according to the present invention.

In the frame 10*h* shown in FIG. 3H, a pair of inner faces extending in directions perpendicular to each other and being in contact with the through hole 12 may be connected by a face inclining to these inner faces. For example, in a cross-section of the frame 10*h* along a plane including the axis of the through hole 12 and being parallel to the axis, outlines of the pair of inner faces extending in the directions perpendicular to each other are connected by an outline inclining to both outlines at an angle of 45°. The pair of inner faces extending in the directions perpendicular to each other and being in contact with the through hole 12 may be connected by a round curved face. It can be said that the above shape of the frame 10*h* is obtained from the frame of the optical filter shown in FIG. 1B by chamfering or filleting an appropriate amount of an edge portion being a part of the inner face defining the through hole having the protruding portion 16. The size of the fillet face may be C0.01 to C0.25 or C0.025 to C0.1. The size of the chamfered face may be R0.01 to R0.25 or R0.025 to R0.1. A part of the inner face defining the through hole of each of the above frames of FIG. 3A to FIG. 3G may be chamfered or filleted as described above.

Figure 3I:
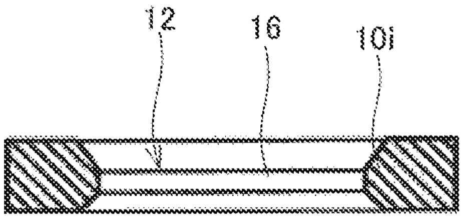
FIG. 3I is a cross-sectional view of yet another example of the frame of the optical filter according to the present invention.

The frame 10*i* shown in FIG. 3I includes the protruding portion 16 in contact with the through hole 12. The protruding portion 16 has faces forming a tapered shape, the faces extending from both end faces of the frame 10*i* in the direction perpendicular to the principal surfaces of the light-absorbing film 20 (not illustrated).

As shown in FIG. 1B, the light-absorbing film 20 has a thickness, for example, smaller than the dimension of the frame 10 in the thickness direction of the light-absorbing film 20. In this case, since the light-absorbing film 20 is integrated with the frame 10, it is easy to handle the optical filter 1 even when the light-absorbing film 20 has a small thickness.

The thickness of the light-absorbing film 20 is not limited to a particular thickness. The light-absorbing film 20 has, for example, a thickness of 1 μm to 1000 μm.

The thickness of the light-absorbing film 20 may be 10 μm to 500 μm or 50 μm to 300 μm.

As shown in FIG. 1B, the light-absorbing film 20 has, for example, the first principal surface 22. The first principal surface 22 is provided between the one end and the other end of the frame 10 in the thickness direction of the light-absorbing film 20. In this case, it is possible to move the optical filter 1 without touching the first principal surface 22, and the yield rate of a product including the optical filter 1 is likely to increase. The first principal surface 22 is provided, for example, over the first face 14 in the thickness direction of the light-absorbing film 20. The first principal surface 22 may be provided to lie in the same plane with the first face 14.

As shown in FIG. 1B, the light-absorbing film 20 has, for example, the second principal surface 24. The second principal surface 24 is provided, for example, to lie in the same plane with the one end of the frame 10 in the thickness direction of the light-absorbing film 20. In this case, the second principal surface 24 of the light-absorbing film 20 does not form a step in the optical filter 1, and the light-absorbing film 20 can be prevented from being brought into contact with another member and thereby damaged at the time of conveyance of the optical filter 1. As a result, the yield rate of a product including the optical filter 1 is likely to increase. Moreover, since there is the light-absorbing film 20 at one end of the through hole 12 in the thickness direction of the light-absorbing film 20, direct application of light to a portion of the inner face of the frame 10 can be prevented, the portion being in contact with the through hole 12. The second principal surface 24 may be provided between the one end and the other end of the frame 10 in the thickness direction of the light-absorbing film 20.

As shown in FIG. 1B, the light-absorbing film 20 covers the protruding portion 16 in the thickness direction of the light-absorbing film 20. As shown in FIGS. 3J to 3P, for example, the light-absorbing film 20 may cover, in the thickness direction of the light-absorbing film 20, at least one of a portion of the protruding portion provided inside the through hole of the frame or at least a portion of the recessed portion provided inside the through hole of the frame.

Figure 3J:
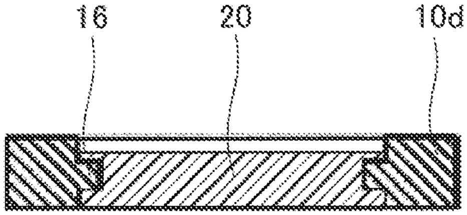
FIG. 3J is a cross-sectional view of another example of the optical filter according to the present invention.
Figure 3K:
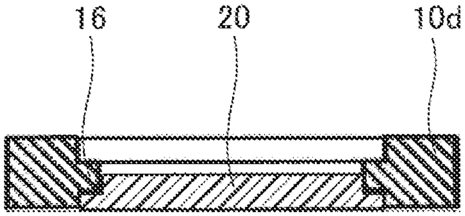
FIG. 3K is a cross-sectional view of yet another example of the optical filter according to the present invention.

FIGS. 3J and 3K each show an optical filter obtained by providing the light-absorbing film 20 inside the through hole 12 of the frame 10*d* shown in FIG. 3D. In the optical filter shown in FIG. 3J, the light-absorbing film 20 covers the entire protruding portion 16 in the thickness direction of the light-absorbing film 20. In the optical filter shown in FIG. 3K, the light-absorbing film 20 covers a portion of the protruding portion 16 in the thickness direction of the light-absorbing film 20.

In the optical filter shown in FIG. 3J, the light-absorbing film 20 is in contact with three faces (two faces parallel to the end faces of the frame 10*d* and one face perpendicular to the two faces) forming the protruding portion 16 inside the through hole of the frame 10*d*. In the optical filter shown in FIG. 3K, the light-absorbing film 20 is in contact with two faces (one face parallel to the end faces of the frame 10*d* and another face perpendicular to the one face) forming the protruding portion 16 inside the through hole of the frame 10*d*.

Figure 3L:
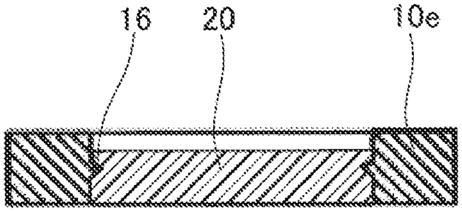
FIG. 3L is a cross-sectional view of yet another example of the optical filter according to the present invention.

FIG. 3L shows an optical filter obtained by providing the light-absorbing film 20 inside the through hole 12 of the frame 10*e* shown in FIG. 3E. In the optical filter shown in FIG. 3L, the light-absorbing film 20 covers the entire protruding portion 16 in the thickness direction of the light-absorbing film 20. In the optical filter shown in FIG. 3L, the light-absorbing film 20 may cover a portion of the protruding portion 16 in the thickness direction of the light-absorbing film 20.

In the optical filter shown in FIG. 3L, the light-absorbing film 20 is in contact with two faces forming a triangular protruding portion inside the through hole of the frame 10*e*, the triangular protruding portion protruding toward a central portion of the through hole. Moreover, although the frame 10*e* included in the optical filter shown in FIG. 3L includes the protruding portion inside the through hole, the protruding portion does not have a face parallel to the end faces of the frame, unlike in the frame included in the optical filter shown in, for example, FIG. 1B. Such a configuration is also included in the present invention.

Figure 3M:
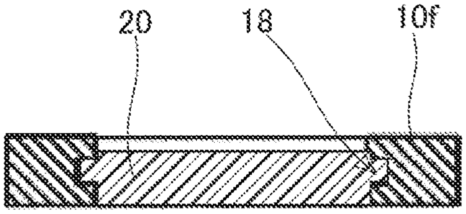
FIG. 3M is a cross-sectional view of yet another example of the optical filter according to the present invention.
Figure 3N:
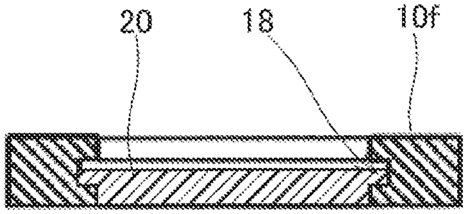
FIG. 3N is a cross-sectional view of yet another example of the optical filter according to the present invention.

FIGS. 3M and 3N each show an optical filter obtained by providing the light-absorbing film 20 inside the through hole 12 of the frame 10*f* shown in FIG. 3F. In the optical filter shown in FIG. 3M, the light-absorbing film 20 covers the entire recessed portion 18 in the thickness direction of the light-absorbing film 20. In the optical filter shown in FIG. 3N, the light-absorbing film 20 covers a portion of the recessed portion 18 in the thickness direction of the light-absorbing film 20.

In the optical filter shown in FIG. 3M, the light-absorbing film 20 is in contact with three faces (two faces parallel to the end faces of the frame 10*f* and one face perpendicular to the two faces) forming the recessed portion 18 inside the through hole of the frame 10*f*. In the optical filter shown in FIG. 3N, the light-absorbing film 20 is in contact with two faces (one face parallel to the end faces of the frame 10*f* and another face perpendicular to the one face) forming the recessed portion 18 inside the through hole of the frame 10*f*.

Figure 3O:
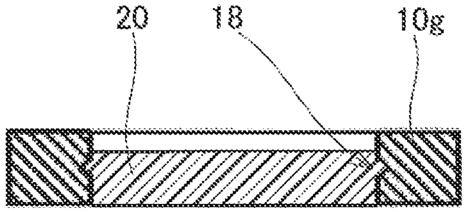
FIG. 3O is a cross-sectional view of yet another example of the optical filter according to the present invention.

FIG. 3O shows an optical filter obtained by providing the light-absorbing film 20 inside the through hole 12 of the frame 10*g* shown in FIG. 3G. In the optical filter shown in FIG. 3O, the light-absorbing film 20 covers the entire recessed portion 18 in the thickness direction of the light-absorbing film 20. In the optical filter shown in FIG. 3O, the light-absorbing film 20 may cover a portion of the recessed portion 18 in the thickness direction of the light-absorbing film 20.

In the optical filter shown in FIG. 3O, the light-absorbing film 20 is in contact with two faces forming a triangular recessed portion inside the through hole of the frame 10*g*, the triangular recessed portion being recessed outward with respect to the through hole. Moreover, although the frame 10*g* included in the optical filter shown in FIG. 3O includes the recessed portion inside the through hole, the protruding portion does not have a face parallel to the end faces of the frame, unlike in the frame included in the optical filter shown in, for example, FIG. 1B. Such a configuration is also included in the present invention.

Figure 3P:
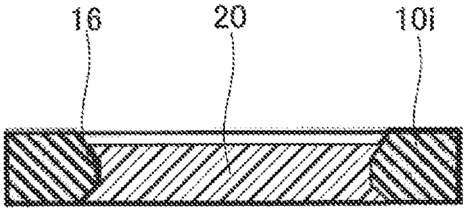
FIG. 3P is a cross-sectional view of yet another example of the optical filter according to the present invention.

FIG. 3P shows an optical filter obtained by providing the light-absorbing film 20 inside the through hole 12 of the frame 10*i* shown in FIG. 3I. In the optical filter shown in FIG. 3P, the light-absorbing film 20 covers a portion of the protruding portion 16 in the thickness direction of the light-absorbing film 20. In the optical filter shown in FIG. 3P, the light-absorbing film 20 may cover the entire protruding portion 16 in the thickness direction of the light-absorbing film 20.

In the optical filter shown in FIG. 3P, the light-absorbing film 20 is in contact with three faces forming a trapezoidal protruding portion inside the through hole of the frame 10*i*, the trapezoidal protruding portion protruding toward the central portion of the through hole. Moreover, although the frame 10*i* included in the optical filter shown in FIG. 3P includes the protruding portion inside the through hole, the protruding portion does not have a face parallel to the end faces of the frame, unlike in the frame included in the optical filter shown in, for example, FIG. 1B. Such a configuration is also included in the present invention.

As described above, in each of the optical filters according to FIG. 1B and FIGS. 3J to 3P, at least two of the faces forming the protruding portion or recessed portion inside the through hole of the frame included in the optical filter are in contact with the light-absorbing film.

The light-absorbing film 20 is not limited to a particular film as long as the light-absorbing film 20 can absorb light with a given wavelength. The light-absorbing film 20 has, for example, a transmission spectrum satisfying the following requirements (I), (II), (III), (IV), (V), (VI), and (VII):

(I) a first cut-off wavelength at which a transmittance is 50% lies in a wavelength range of 380 nm to 440 nm;

(II) a second cut-off wavelength at which a transmittance is 50% lies in a wavelength range of 600 nm to 720 nm;

(III) a maximum transmittance in a wavelength range of 300 nm to 350 nm is 1% or less;

(IV) an average transmittance in a wavelength range of 450 nm to 600 nm is 75% or more;

(V) a maximum transmittance in a wavelength range of 750 nm to 1000 nm is 5% or less;

(VI) a maximum transmittance in a wavelength range of 800 nm to 950 nm is 4% or less; and (VII) a transmittance at a wavelength of 1100 nm is 20% or less.

Herein, "a maximum transmittance in the wavelength range of X nm to Y nm is A % or less" means that the transmittance is A % or less throughout the wavelength range of X nm to Y nm.

As to the above requirement (I), the first cut-off wavelength lies desirably in the wavelength range of 385 nm to 435 nm, and more desirably in the wavelength range of 390 nm to 430 nm.

As to the above requirement (II), the second cut-off wavelength lies desirably in the wavelength range of 610 nm to 700 nm, and more desirably in the wavelength range of 620 nm to 680 nm.

As to the above requirement (IV), the average transmittance in the wavelength range of 450 nm to 600 nm is desirably 78% or more, and more desirably 80% or more.

As to the above requirement (V), the maximum transmittance in the wavelength range of 750 nm to 1000 nm is desirably 3% or less, and more desirably 1% or less.

As to the above requirement (VI), the maximum transmittance in the wavelength range of 800 nm to 950 nm is desirably 2% or less, and more desirably 0.5% or less.

As to the above requirement (VII), the transmittance at the wavelength of 1100 nm is desirably 15% or less, and more desirably 10% or less.

The light-absorbing film 20 is, for example, in direct contact with the inner face of the frame 10 and thereby fixed to the frame 10. In other words, no adhesive layer is present between the light-absorbing film 20 and the frame 10. The light-absorbing film 20 may be fixed to the frame 10 by an adhesive.

The light-absorbing compound in the light-absorbing film 20 is not limited to a particular compound as long as the light-absorbing film 20 can absorb light with a given wavelength. The light-absorbing compound may include, for example, a phosphonic acid represented by the following formula (a) and a copper component.

(a)

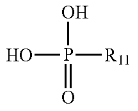

In the formula, $R_{11}$ is an alkyl group, an aryl group, a nitroaryl group, a hydroxyaryl group, or an aryl halide group in which at least one hydrogen atom of an aryl group is substituted by a halogen atom.

In the light-absorbing film 20, the light-absorbing compound is formed, for example, by coordination of the phosphonic acid represented by the formula (a) to the copper component. For example, fine particles including at least the light-absorbing compound are present in the light-absorbing film 20. In this case, the fine particles are dispersed in the light-absorbing film 20 without aggregation. The average particle diameter of the fine particles is, for example, 5 nm to 200 nm. When the average particle diameter of the fine particles is 5 nm or more, no particular ultramicronization process is required to obtain the fine particles, and the risk of structural destruction of the fine particles including at least the light-absorbing compound is low. Additionally, the fine particles are well dispersed in the light-absorbing film 20. When the average particle diameter of the fine particles is 200 nm or less, it is possible to reduce the influence of Mie scattering, increase the visible transmittance of the light-absorbing film 20, and prevent deterioration of properties, such as contrast and haze, of an image captured by an imaging apparatus. The average particle diameter of the fine particles is desirably 100 nm or less. In this case, the influence of Rayleigh scattering is reduced, and thus the light-absorbing film 20 has an increased transparency to visible light. The average particle diameter of the fine particles is more desirably 75 nm or less. In this case, the light-absorbing film 20 has especially high transparency to visible light. The average particle diameter of the fine particles can be measured using the composition for forming the light-absorbing film 20 by a dynamic light scattering method.

The light-absorbing film 20 includes, for example, a hydrolysis-condensation product of an alkoxysilane. In this case, the light-absorbing film 20 has a firm skeleton having a siloxane bond (—Si—O—Si—).

The hydrolysis-condensation product of the alkoxysilane in the light-absorbing film 20 includes, for example, a hydrolysis-condensation product of a dialkoxysilane. This makes it likely that a firm skeleton having a siloxane bond is formed in the light-absorbing film 20 and the light-absorbing film 20 has desired flexibility owing to an organic functional group derived from the dialkoxysilane. As a result, cracking and chipping are less likely to be caused by cutting the light-absorbing film 20. Additionally, the light-absorbing film 20 is less likely to be broken by an external force applied to bend the light-absorbing film 20. Moreover, even when there is a big difference between a coefficient of thermal expansion of the frame 10 and a coefficient of thermal expansion of the light-absorbing film 20, the light-absorbing film 20 can flexibly change its shape in response to expansion and shrinkage of the frame 10. As a result, a thermal stress has a limited effect on the light-absorbing film 20, and defects such as cracking and peeling of the light-absorbing film 20 from the frame 10 are less likely to happen in a heat cycle test.

The hydrolysis-condensation product of the dialkoxysilane is not limited to a particular hydrolysis-condensation product of a dialkoxysilane. The hydrolysis-condensation product of the dialkoxysilane is derived, for example, from the dialkoxysilane having a hydrocarbon group bonded to a silicon atom, the hydrocarbon group having 1 to 6 carbon atoms. The dialkoxysilane may have a halogenated hydrocarbon group. In the halogenated hydrocarbon group, at least one hydrogen atom of a hydrocarbon group bonded to a silicon atom and having 1 to 6 carbon atoms is substituted by a halogen atom.

The hydrolysis-condensation product of the dialkoxysilane may be derived, for example, from an alkoxysilane represented by the following formula (b). In this case, the desired flexibility is likely to be more reliably imparted to the light-absorbing film 20.

$$(R_2)_2—Si—(OR_3)_2 \qquad (b)$$

In the formula, each $R_2$ is independently an alkyl group having 1 to 6 carbon atoms, and each $R_3$ is independently an alkyl group having 1 to 8 carbon atoms.

The hydrolysis-condensation product of the dialkoxysilane may be, for example, a hydrolysis-condensation product of dimethyldiethoxysilane, dimethyldimethoxysilane, diethyldiethoxysilane, diethyldimethoxysilane, 3-glycidoxypropylmethyldimethoxysilane, or 3-glycidoxypropylmethyldiethoxysilane.

The hydrolysis-condensation product of the alkoxysilane may further include a hydrolysis-condensation product of at least one of a tetraalkoxysilane and a trialkoxysilane. In this case, a dense structure is likely to be formed in the light-absorbing film 20 owing to a siloxane bond.

The hydrolysis-condensation product of the alkoxysilane may further include a hydrolysis-condensation product of a tetraalkoxysilane and a hydrolysis-condensation product of a trialkoxysilane. In this case, a dense structure is likely to be formed more reliably in the light-absorbing film 20 owing to a siloxane bond.

The tetraalkoxysilane or the trialkoxysilane for the hydrolysis-condensation product of the alkoxysilane in the light-absorbing film 20 is not limited to a particular alkoxysilane. For example, the tetraalkoxysilane or the trialkoxysilane for the hydrolysis-condensation product of the alkoxysilane in the light-absorbing film 20 is at least one selected from the group consisting of tetramethoxysilane, tetraethoxysilane, methyltrimethoxysilane, methyltriethoxysilane, phenyltrimethoxysilane, phenyltriethoxysilane, 3-glycidoxypropyltrimethoxysilane, 3-glycidoxypropyltriethoxysilane, n-propyltriethoxysilane, n-propyltrimethoxysilane, hexyltriethoxysilane, hexyltrimethoxysilane, trifluoropropyltriethoxysilane, trifluoropropyltrimethoxysilane, vinyltriethoxysilane, vinyltrimethoxysilane, 3-aminopropyltriethoxysilane, 3-aminopropyltrimethoxysilane, 3-mercaptopropyltriethoxysilane, 3-mercaptopropyltrimethoxysilane, 3-isocyanatopropyltriethoxysilane, and 3-isocyanatopropyltrimethoxysilane.

An amount of the dialkoxysilane and the hydrolysis-condensation product of the dialkoxysilane in the alkoxysilane and the hydrolysis-condensation product of the alkoxysilane in the light-absorbing film 20 is not limited to a particular value. A ratio of the amount of the dialkoxysilane and the hydrolysis-condensation product of the dialkoxysilane in the light-absorbing film 20 to the total amount of the alkoxysilane and the hydrolysis-condensation product of the alkoxysilane in the light-absorbing film 20 is, for example, 6 to 48% on a mass basis when the alkoxysilanes and the hydrolysis-condensation products are calculated as complete-hydrolysis-condensation products. In this case, the average Young's modulus measured by continuous stiffness measurement of the light-absorbing film 20 is likely to be adjusted more reliably in a desired range. The ratio is desirably 8 to 35%, and more desirably 10 to 30%. In this case, the light-absorbing film 20 is likely to have a high moisture resistance. This is because a dense structure is likely to be formed owing to a siloxane bond and the light-absorbing compound is unlikely to form an aggregation in a high-humidity environment.

The light-absorbing film 20 further includes, for example, a phosphoric acid ester. The light-absorbing compound is likely to be dispersed well in the light-absorbing film 20 by action of the phosphoric acid ester. In the light-absorbing film 20, the compound derived from the alkoxysilane can impart a higher moisture resistance to the light-absorbing film 20 than the phosphoric acid ester and can allow the light-absorbing compound to be appropriately dispersed. The inclusion of the alkoxysilane in the light-absorbing film 20 can therefore reduce the amount of the phosphoric acid ester used. A reaction of the alkoxysilane around the light-absorbing compound with the dialkoxysilane in the process of forming the light-absorbing film 20 is likely to make the light-absorbing film 20 homogeneous and highly dense. The light-absorbing film 20 may be free of the phosphoric acid ester.

The phosphoric acid ester is, for example, a phosphoric acid ester having a polyoxyalkyl group. The phosphoric acid ester having a polyoxyalkyl group is not limited to a particular phosphoric acid ester. The phosphoric acid ester having a polyoxyalkyl group is, for example, PLYSURF A208N (polyoxyethylene alkyl (C12, C13) ether phosphoric acid ester), PLYSURF A208F (polyoxyethylene alkyl (C8) ether phosphoric acid ester), PLYSURF A208B (polyoxyethylene lauryl ether phosphoric acid ester), PLYSURF A219B (polyoxyethylene lauryl ether phosphoric acid ester), PLYSURF AL (polyoxyethylene styrenated phenylether phosphoric acid ester), PLYSURF A212C (polyoxyethylene tridecyl ether phosphoric acid ester), or PLYSURF A215C (polyoxyethylene tridecyl ether phosphoric acid ester). All of these are products manufactured by DKS Co., Ltd. The phosphoric acid ester may be, for example, NIKKOL DDP-2 (polyoxyethylene alkyl ether phosphoric acid ester), NIKKOL DDP-4 (polyoxyethylene alkyl ether phosphoric acid ester), or NIKKOL DDP-6 (polyoxyethylene alkyl ether phosphoric acid ester). All of these are products manufactured by Nikko Chemicals Co., Ltd.

The light-absorbing film 20 further includes, for example, a resin. The resin is not limited to a particular resin. The resin is, for example, a silicone resin. The silicone resin is a compound having a siloxane bond in its structure. In this case, since the hydrolysis-polycondensation product of the alkoxysilane also has a siloxane bond, the hydrolysis-polycondensation product of the alkoxysilane and the resin are compatible with each other in the light-absorbing film 20.

The resin is desirably a silicone resin including an aryl group such as a phenyl group. If the resin included in the light-absorbing film 20 is excessively hard (rigid), the likelihood of cure-shrinkage-induced cracking during a manufacturing process of the light-absorbing film 20 increases with increasing thickness of the light-absorbing film 20. When the resin is a silicone resin including an aryl group, the light-absorbing film is likely to have a high crack resistance. The silicone resin including an aryl group has high compatibility with the phosphonic acid represented by the formula (a) and reduces the likelihood of aggregation of the light-absorbing compound. Specific examples of the silicone resin available as the resin include KR-255, KR-300, KR-2621-1, KR-211, KR-311, KR-216, KR-212, KR-251, and KR-5230. All of these are silicone resins manufactured by Shin-Etsu Chemical Co., Ltd.

One example of the method for manufacturing the optical filter 1 will be described. The method for manufacturing the optical filter 1 includes, for example, the following steps (i) and (ii).

(i) Supplying a resin composition including the light-absorbing compound to close the through hole 12 of the frame 10.

(ii) Curing the resin composition supplied in (i) to form the light-absorbing film 20.

Figure 4:
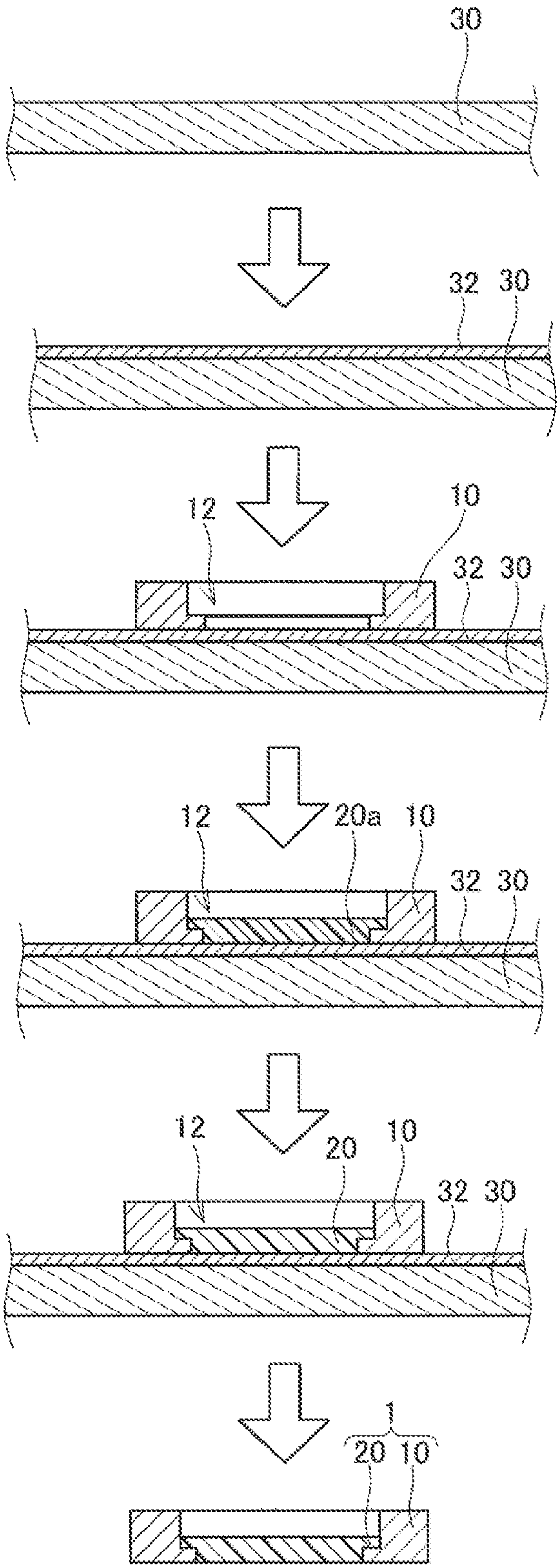
FIG. 4 shows an example of an optical filter manufacturing method according to the present invention.

FIG. 4 is a flow chart for describing an example of manufacturing of the optical filter 1 according to this example, and describes the method for manufacturing the optical filter 1 according to FIGS. 1A and 1B as an example. Note that the following description and FIG. 4 used for the description describe the core of the optical filter manufacturing method according to the present invention and do not reflect a specific and definite configuration.

The optical filter 1 may be manufactured by a method shown in FIG. 4. According to this method, a substrate 30 is prepared first. The substrate 30 is not limited to a particular substrate. The substrate 30 may be a glass substrate, a substrate made of a metal such as stainless steel or aluminum, a substrate made of a ceramic such as alumina or zirconia, or a resin substrate. The substrate 30 is desirably a glass substrate. In this case, a flat and smooth surface is likely to be obtained with ease and at low price.

As can be understood from FIG. 4, the substrate 30 has at least one flat principal surface.

Next, a coating 32 is formed on the principal surface of the substrate 30. The coating 32 is formed so as to facilitate peeling of the light-absorbing film 20 in a later step. The coating 32 is, for example, hydrophobic or water-repellent. The coating 32 includes, for example, a fluorine compound. A surface treatment that facilitates peeling of the light-absorbing film 20 in the later step may be performed on the substrate 30 by a technique other than formation of the coating 32. In the case where the principal surface of the substrate 30 has properties that facilitate peeling of the light-absorbing film 20, formation of the coating 32 and other surface treatments may be omitted. For example, formation of the coating 32 and other surface treatments can be omitted for the substrate 30 which is a fluorine resin substrate.

Next, the frame 10 is placed on the coating 32. In this case, the frame 10 may be fixed to the substrate 30 using a jig (not illustrated). A plurality of frames 10 may be placed on one substrate 30. The frame 10 is desirably placed in such a manner that a portion of a face of the frame 10 and the surface of the coating 32 are so closely in contact with each other that there is no gap between the portion of the face of the frame 10 and the surface of the coating 32.

As can be understood from figures showing cross-sectional views (particularly the third one from the top) of the frame 10 in FIG. 4, the frame 10 is in the shape of a flat plate having two parallel flat principal surfaces and has the through hole 12 penetrating the frame 10 in the thickness direction. One of the principal surfaces of the frame 10 is placed on the flat principal surface of the substrate 30 or the surface of the coating 32 on the principal surface of the substrate 30. The frame 10 includes the protruding portion 16 inside the through hole 12. The protruding portion 16 includes the first face 14 parallel to the principal surfaces of the frame 10.

Next, a given amount of a light-absorbing composition 20*a* is supplied to close the through hole 12 of the frame 10. An amount of the light-absorbing composition 20*a* supplied is adjusted so that the light-absorbing film 20 obtained by curing the light-absorbing composition 20*a* will have a thickness that allows the light-absorbing film 20 to exhibit desired optical properties such as a desired transmission spectrum.

At this time, as can be understood from FIG. 4 (particularly the fourth or fifth one from the top), one end face of the light-absorbing film 20 in the thickness direction is closely in contact with the flat principal surface of the substrate 30 or the surface of the coating 32 on the principal surface of the substrate 30. This assures that one principal surface of the light-absorbing film 20 in the thickness direction will be substantially flush with one of the principal surfaces of the frame 10.

Additionally, as can be understood from FIG. 4 (particularly the fourth or fifth one from the top), the other end face of the light-absorbing film 20 farther from the substrate 30 is formed by supplying the light-absorbing composition 20*a* beyond the height of the first face 14.

Next, the light-absorbing composition 20*a* is cured to form the light-absorbing film 20. For example, the light-absorbing composition 20*a* can be cured by heating the light-absorbing composition 20*a* in a heating furnace or an oven. Curing conditions for the light-absorbing composition 20*a* can be adjusted, for example, according to curing conditions for a curable resin included in the light-absorbing composition 20*a*. The curing conditions can include a condition regarding the temperature of an atmosphere around the light-absorbing composition 20*a* and a condition regarding time.

As can be understood from FIG. 4, a ratio of the thickness of the light-absorbing film 20 to the length t2 is greater than 1. The length t2 corresponds to a distance between one end face of the frame 10 and the first face 14 in the thickness direction of the light-absorbing film 20.

Next, the light-absorbing film 20 is peeled off the substrate 30 together with the frame 10. The optical filter 1 can be obtained in this manner. When the light-absorbing film 20 includes the alkoxysilane or the hydrolysate thereof, formation of a siloxane bond in the light-absorbing film 20 may be promoted by exposing the light-absorbing film 20 to an atmosphere at a temperature of about 60° C. to 90° C. and a given relative humidity of 90% or less. This is likely to make the matrix of the light-absorbing film 20 more firm.

The light-absorbing composition 20*a* is not limited to a particular composition as long as the light-absorbing film 20 can be formed. The light-absorbing composition 20*a* includes, for example, a component included in the light-absorbing film 20 or a precursor of a component included in the light-absorbing film 20. A case where the light-absorbing compound includes the above phosphonic acid and a copper component is taken as an example to describe an exemplary method for preparing the light-absorbing composition 20*a*.

For example, in the case where the light-absorbing composition 20*a* includes a phosphonic acid (aryl-based phosphonic acid) represented by the formula (a) in which $R_{11}$ is an aryl group, a nitroaryl group, a hydroxyaryl group, or an aryl halide group, a solution D is prepared in the following manner. A copper salt such as copper acetate monohydrate is added to a given solvent such as tetrahydrofuran (THF), and the mixture is stirred to prepare a solution A which is a copper salt solution. Next, an aryl-based phosphonic acid is added into a given solvent such as THF, and the mixture is then stirred to prepare a solution B. When a plurality of aryl-based phosphonic acids are used as the phosphonic acid represented by the formula (a), the solution B may be prepared by adding each aryl-based phosphonic acid to a given solvent such as THF, stirring each mixture, and mixing the plurality of preliminary liquids each prepared to contain a different aryl-based phosphonic acid. For example, an alkoxysilane is added in preparation of the solution B. The solution B is added to the solution A while the solution A is stirred, and the mixture is stirred for a given period of time. To the resulting solution is then added a given solvent such as toluene, and the mixture is stirred to obtain a solution C. Subsequently, the solution C is subjected to solvent removal under heating for a given period of time to obtain a solution D. This process removes the solvent such as THF and a component, such as acetic acid (boiling point: about 118° C.), generated by disassociation of the copper salt, yielding a light-absorbing compound by a reaction between the phosphonic acid represented by the formula (a) and the copper component. The temperature at which the solution C is heated is determined on the basis of the boiling point of the to-be-removed component disassociated from the copper salt. During the solvent removal, the solvent such as toluene (boiling point: about 110° C.) used to obtain the solution C is also evaporated. A certain amount of this solvent desirably remains in the light-absorbing composition 20*a*. This is preferably taken into account in determining the amount of the solvent to be added and the time period of the solvent removal. To obtain the solution C, o-xylene (boiling point: about 144° C.) can be used instead of toluene. In this case, the amount of o-xylene to be added can be reduced to about one-fourth of the amount of toluene to be added, because the boiling point of o-xylene is higher than the boiling point of toluene.

When the light-absorbing composition 20*a* includes a phosphonic acid (alkyl-based phosphonic acid) represented by the formula (a) in which $R_{11}$ is an alkyl group, a solution H is further prepared, for example, in the following manner. First, a copper salt such as copper acetate monohydrate is added to a given solvent such as tetrahydrofuran (THF), and the mixture is stirred to give a solution E which is a copper salt solution. A solution F is also prepared by adding the alkyl-based phosphonic acid to a given solvent such as THF and stirring the mixture. When a plurality of phosphonic acids are used as the alkyl-based phosphonic acid, the solution F may be prepared by adding each alkyl-based phosphonic acid to a given solvent such as THF, stirring each mixture, and mixing the plurality of preliminary liquids each prepared to contain a different alkyl-based phosphonic acid. For example, the alkoxysilane is further added to prepare the solution F. The solution F is added to the solution E while the solution E is stirred, and the mixture is further stirred for a given period of time. To the resulting solution is then added a given solvent such as toluene, and the mixture is stirred to obtain a solution G. Subsequently, the solution G is subjected to solvent removal under heating for a given period of time to obtain a solution H. This process removes the solvent such as THF and the component, such as acetic acid, generated by disassociation of the copper salt. The temperature at which the solution G is heated is determined as in the case of the solution C. The solvent for obtaining the solution G is also determined as in the case of the solution C.

The light-absorbing composition 20*a* can be prepared, for example, by mixing the solutions D and H in a given proportion, adding an alkoxysilane thereto, and, if necessary, adding a curable resin such as a silicone resin thereto. In this case, mixing of the solutions D and H may be followed by addition of a dialkoxysilane. In the light-absorbing composition 20*a*, the aryl-based phosphonic acid and the alkyl-based phosphonic acid may undergo a reaction with the copper component to form a complex. Alternately, a portion of the phosphoric acid ester added may undergo a reaction with the copper component to form a complex likewise, or a portion of the phosphoric acid ester may undergo a reaction with the phosphonic acids or the copper component to form a complex. The light-absorbing film 20 formed by curing the light-absorbing composition 20*a* can exhibit desired light absorption performance by the action of each material, particularly the copper component such as copper ion.

The optical filter 1 may include an additional functional film on one of the principal surfaces or both principal surfaces of the light-absorbing film 20. The functional film is, for example, an antireflection film having an antireflecting function or a reflection-reducing function. The antireflection film may be designed or produced, for example, so that reflection of visible light expected to be transmitted through the light-absorbing film 20 will be reduced. In this case, the transmittance of visible light is improved and, when the optical filter 1 is used in an imaging apparatus, a brighter image is likely to be obtained. The antireflection film can be obtained by forming a dielectric film having an appropriate thickness on the principal surface of the light-absorbing film 20. Examples of the dielectric include $SiO_2$, $TiO_2$, $Ti_3N_4$, $Al_2O_3$, and MgO. The antireflection film may be a single-layer dielectric film or may be a multilayer dielectric film formed of different dielectrics. For example, when a low-refractive-index material is used to form the antireflection film, the antireflection film can exhibit a good reflection-reducing function with a fewer layers. For example, in the case where hollow particles or a material including a sol of hollow particles is enclosed in a matrix of a resin or another material, a film or layer having a low refractive-index as a whole can be formed because the apparent refractive index of the hollow particles is low. Commercially available hollow particles are formed of $SiO_2$, $TiO_2$, or the like. A curable resin, a silane compound capable of being cured by a sol-gel process and having a low refractive index, or the like is suitable as the matrix of the antireflection film.

The functional film may be a reflective film capable of reflecting a portion of light. The reflective film, as well as the light-absorbing film 20, has a function of blocking a portion of light. Light with a given wavelength can be blocked in conjunction with the light-absorbing film 20 and the reflective film. The reflective film can be formed, for example, as a multilayer dielectric film. In this case, the flexibility in designing wavelength properties of the reflective film is high, which allows finer adjustment of light to be blocked. Moreover, in this case, absorbance required of the light-absorbing film 20 can be reduced because a portion of light to be blocked by the optical filter 1 can be blocked by the reflection function. Consequently, the thickness of the light-absorbing film 20 or the concentration of the light-absorbing compound included in the light-absorbing film 20 can be reduced. The reflective film can be formed by forming a dielectric film having an appropriate thickness on the principal surface of the light-absorbing film 20. Examples of the dielectric include $SiO_2$, $TiO_2$, $Ti_3N_4$, $Al_2O_3$, and MgO. The reflective film may be a single-layer dielectric film or a multilayer dielectric film.

The functional film may be provided so as to be over a portion of the surface of the frame 10 as well as the surface(s) of the light-absorbing film 20.

Figure 5:
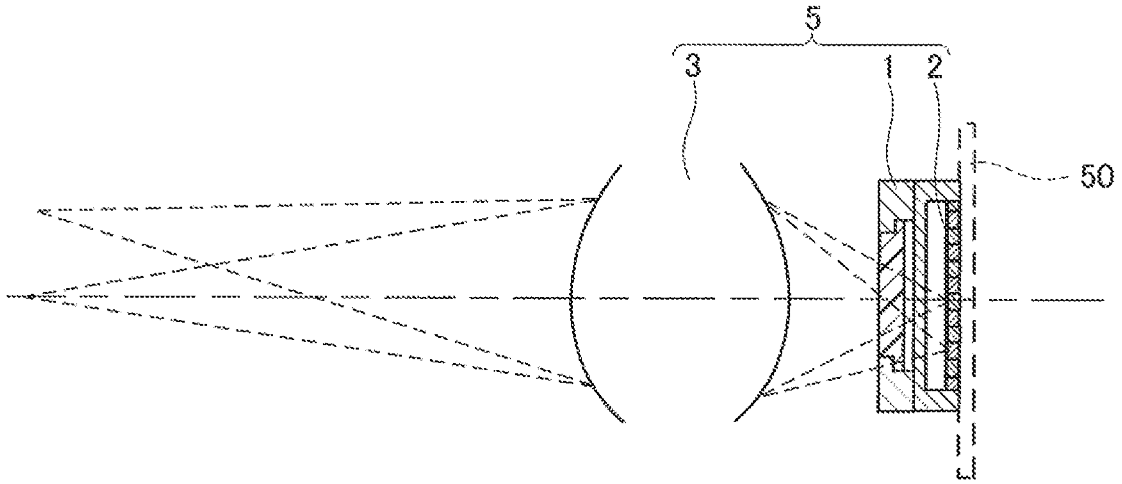
FIG. 5 schematically shows an imaging apparatus according to the present invention.
Figure 6:
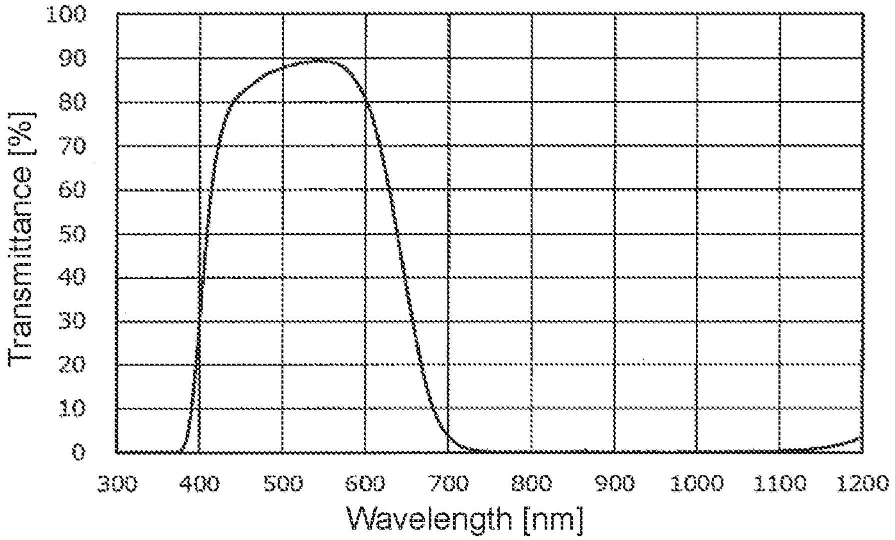
FIG. 6 shows a transmission spectrum shown by an optical filter according to Example 1.
Figure 7:
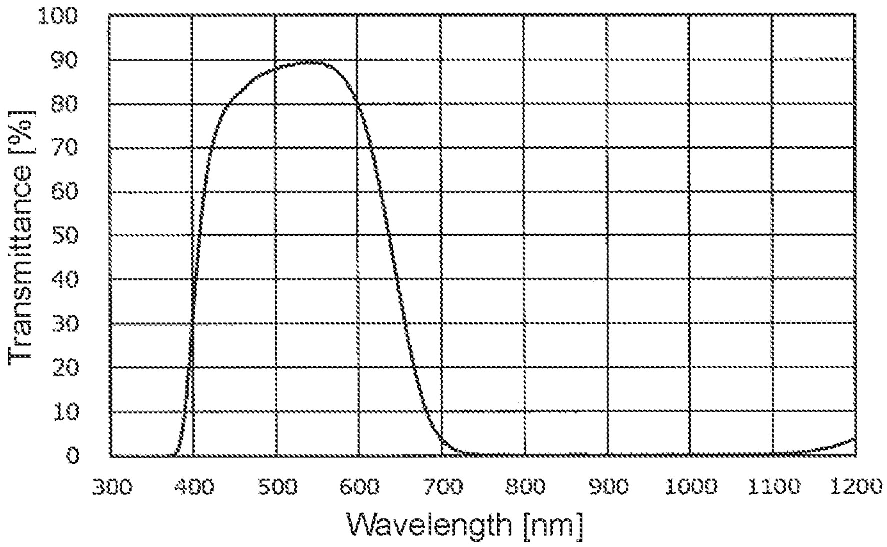
FIG. 7 shows a transmission spectrum shown by an optical filter according to Example 2.
Figure 8:
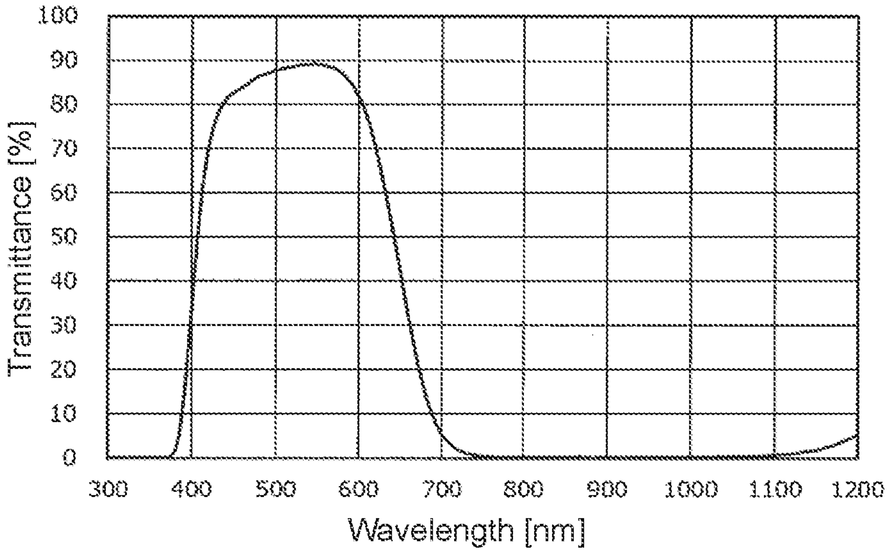
FIG. 8 shows a transmission spectrum shown by an optical filter according to Example 3.
Figure 9:
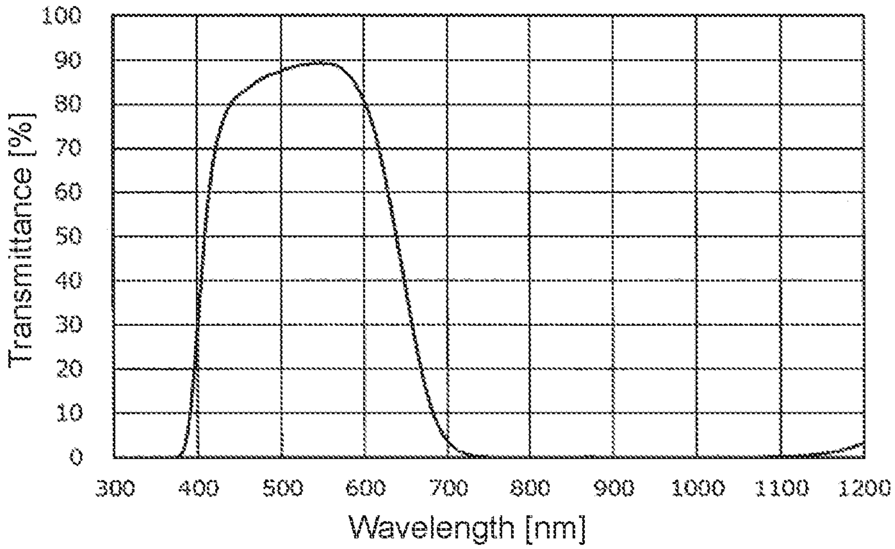
FIG. 9 shows a transmission spectrum shown by an optical filter according to Example 4.
Figure 10:
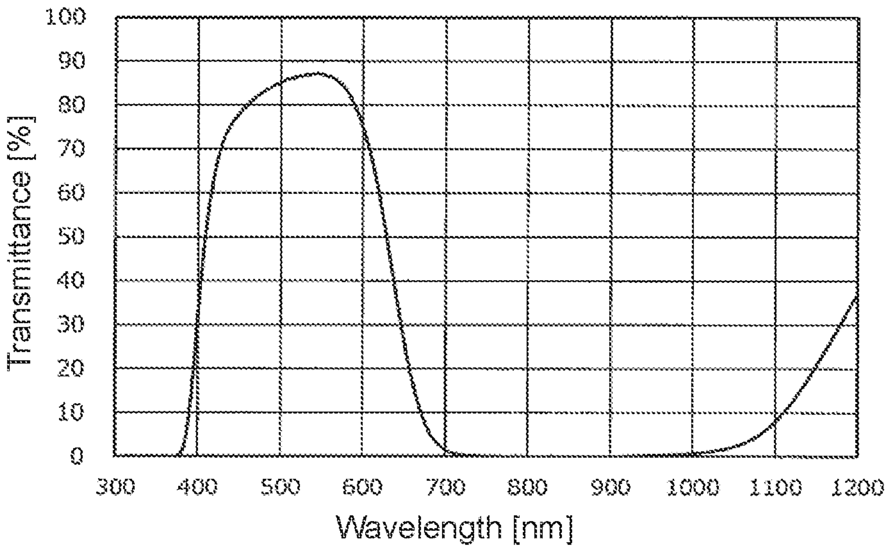
FIG. 10 shows a transmission spectrum shown by an optical filter according to Example 5.
Figure 11:
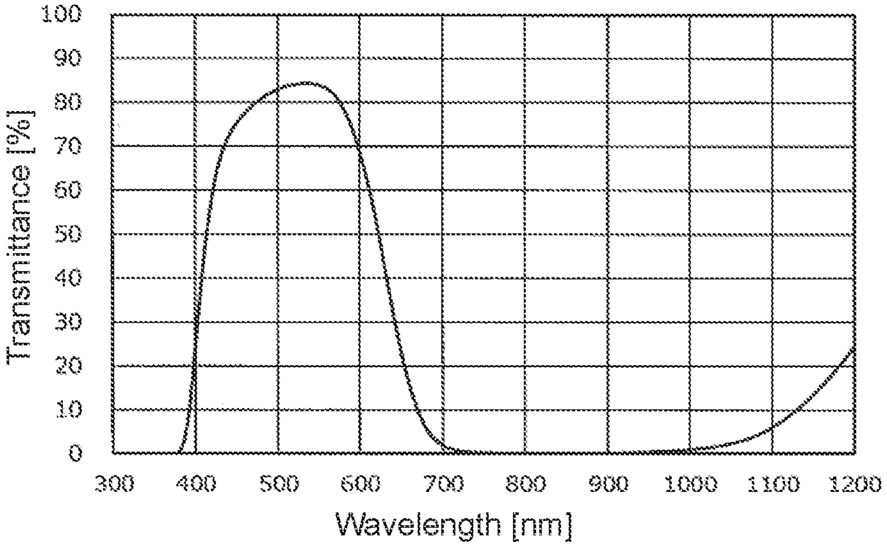
FIG. 11 shows a transmission spectrum shown by an optical filter according to Example 6.
Figure 12:
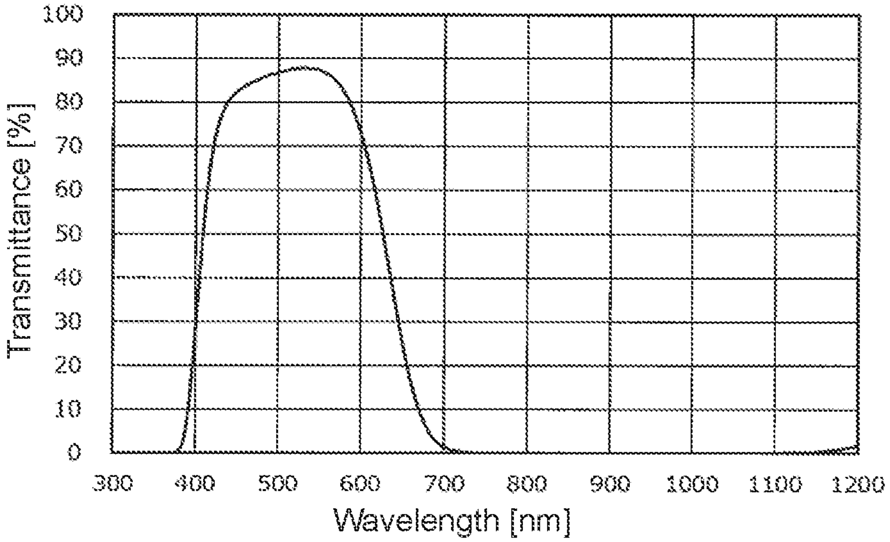
FIG. 12 shows a transmission spectrum shown by an optical filter according to Comparative Example 1.

An imaging apparatus including the optical filter 1 can be provided. As shown in FIG. 5, an imaging apparatus 5 includes an imaging device 2, a lens 3, and the optical filter 1. The lens 3 allows transmission of light from a subject and collects light to the imaging device 2.

The optical filter 1 is disposed, for example, between the lens 3 and the imaging device 2 in an optical path of light from a subject. The imaging device 2 is disposed, for example, on a circuit board 50. In the imaging apparatus 5, for example, the principal surfaces of the light-absorbing film 20 of the optical filter 1 and a light-receiving face of the imaging device 2 are spaced apart, and are not in direct contact with each other. This is likely to decrease the difficulty of a manufacturing process of the imaging apparatus 5 and can reduce man-hours or improve a manufacturing yield of the imaging apparatus 5.

EXAMPLES

The present invention will be described in more detail by examples. The present invention is not limited to the examples given below.

Example 1

An amount of 4.500 g of copper acetate monohydrate and 240 g of tetrahydrofuran (THF) were mixed, and the mixture was stirred for 3 hours to obtain a copper acetate solution. To the obtained copper acetate solution was then added 1.646 g of PLYSURF A208N (manufactured by DKS Co., Ltd.) which is a phosphoric acid ester compound, and the mixture was stirred for 30 minutes to obtain a solution A1. An amount of 40 g of THF was added to 0.706 g of phenylphosphonic acid, and the mixture was stirred for 30 minutes to obtain a solution B1α. An amount of 40 g of THF was added to 4.230 g of 4-bromophenylphosphonic acid, and the mixture was stirred for 30 minutes to obtain a solution B1β. Next, the solution B1α and the solution B1β were mixed, and the mixture was stirred for 1 minute. To the solution mixture were added 8.664 g of methyltriethoxysilane (MTES) (manufactured by Shin-Etsu Chemical Co., Ltd.; product name: KBE-13) and 2.840 g of tetraethoxysilane (TEOS) (manufactured by KISHIDA CHEMICAL Co., Ltd.; special grade), and the resulting mixture was further stirred for 1 minute to obtain a solution B1. The solution B1 was added to the solution A1 while the solution A1 was stirred, and the mixture was stirred at room temperature for 1 minute. To the resulting solution was then added 100 g of toluene, and the mixture was stirred at room temperature for 1 minute to obtain a solution C1. The solution C1 was put in a flask and subjected to solvent removal using a rotary evaporator (manufactured by Tokyo Rikakikai Co., Ltd.; product code: N-1110SF) under heating by means of an oil bath (manufactured by Tokyo Rikakikai Co., Ltd.; product code: OSB-2100). The temperature of the oil bath was controlled to 105° C. A solution D1 having undergone the solvent removal was collected from the flask. The solution D1, which was a liquid composition containing aryl-based phosphonic acids and a copper component, was obtained in this manner.

An amount of 1.800 g of copper acetate monohydrate and 100 g of THF were mixed, and the mixture was stirred for 3 hours to obtain a copper acetate solution. To the obtained copper acetate solution was then added 1.029 g of PLYSURF A208N which is a phosphoric acid ester compound, and the mixture was stirred for 30 minutes to obtain a solution E1. An amount of 40 g of THF was added to 1.154 g of n-butylphosphonic acid, and the mixture was stirred for 30 minutes to obtain a solution F1. The solution F1 was added to the solution E1 while the solution E1 was stirred, and the mixture was stirred at room temperature for 1 minute. To the resulting solution was then added 30 g of toluene, and the mixture was stirred at room temperature for 1 minute to obtain a solution G1. This solution G1 was placed in a flask and subjected to solvent removal using a rotary evaporator under heating by means of an oil bath. The temperature of the oil bath was controlled to 105° C. A solution H1 having undergone the solvent removal was collected from the flask. The solution H1, which was a liquid composition containing n-butylphosphonic acid and a copper component, was obtained in this manner.

The solution D1 and the solution H1 which were liquid compositions, 8.800 g of a silicone resin (manufactured by Shin-Etsu Chemical Co., Ltd.; product name: KR-300), 0.090 g of an aluminum alkoxide compound (manufactured by Shin-Etsu Chemical Co., Ltd.; product name: CAT-AC), 10.840 g of methyltriethoxysilane (MTES) (manufactured by Shin-Etsu Chemical Co., Ltd.; product name: KBE-13), 5.660 g of tetraethoxysilane (TEOS) (manufactured by KISHIDA CHEMICAL Co., Ltd.; special grade), and 4.896 g of dimethyldiethoxysilane (DMDES) (manufactured by Shin-Etsu Chemical Co., Ltd.; product name: KBE-22) were mixed and then stirred for 30 minutes to obtain a solution J1 being a light-absorbing composition.

An amount of 0.1 g of an anti-smudge surface coating agent (manufactured by DAIKIN INDUSTRIES, LTD.; product name: OPTOOL DSX, concentration of active ingredient: 20 mass %) and 19.9 g of a hydrofluoroether-containing solution (manufactured by 3M Company, product name: Novec 7100) were mixed and then stirred for 5 minutes to prepare a fluorine treatment agent (concentration of active ingredient: 0.1 mass %).

A borosilicate glass substrate (manufactured by SCHOTT AG; product name: D263 T eco) having dimensions of 136 mm×108 mm×0.70 mm was prepared. The above fluorine treatment agent was poured over and applied onto one principal surface of the glass substrate. After that, the glass substrate was left at room temperature for 24 hours to dry the coating film of the fluorine treatment agent. The glass surface was then wiped lightly with a dust-free cloth impregnated with Novec 7100 to remove an excess of the fluorine treatment agent. A fluorine-treated substrate coated with a fluorine compound was produced in this manner.

Nine types of frames having dimensions as shown in Table 5 were prepared. Symbols A, B, a, b, t1, and t2 in Table 5 correspond to the dimensions shown in FIG. 1A and FIG. 1B. Frames α-1, α-2, and α-3 are frames made of MC nylon. The average coefficient of linear expansion of the MC nylon in the range of 0° C. to 60° C. is $10.1\times10^{-5}$ [/° C.]. MC nylon is a registered trademark. Frames β-1, β-2, and β-3 are frames made of a high-strength nylon. The average coefficient of linear expansion of the high-strength nylon in the range of 0° C. to 60° C. is $12.5\times10^{-5}$ [/° C.]. Frames γ-1, γ-2, and γ-3 are frames made of PPS. The average coefficient of linear expansion of the PPS in the range of 0° C. to 60° C. is $4.7\times10^{-5}$ [/° C.]. Each frame was disposed on a fluorine-treated substrate produced in the above manner. In this state, a portion of the principal surface of the fluorine-treated substrate was exposed through a through hole of the frame.

The light-absorbing composition solution J1 was poured into the through hole of each frame using a dispenser. After that, the solution J1 was dried in an environment at 45° C. for 3 hours. The temperature of the environment was slowly increased to 85° C. over 10 hours to cause volatilization of the solvent contained in the solution J1. A reaction of the components contained in the solution J1 was thereby promoted to cure the light-absorbing composition. The light-absorbing composition under curing was then placed in an environment at 85° C. and a relative humidity of 85% for 8 hours to complete the curing reaction. A light-absorbing film according to Example 1 was formed thereby to close the through hole of the frame. A thickness at which optical properties, such as a transmission spectrum, of the light-absorbing film formed of the completely cured light-absorbing composition were given properties was determined beforehand for the light-absorbing film, and an amount of the light-absorbing composition poured was controlled so that the light-absorbing film would have that thickness. Then, the frame having the light-absorbing film formed in the through hole and the light-absorbing film were slowly peeled off the fluorine-treated substrate. An optical filter according to Example 1 was obtained in this manner.

In the optical filter according to Example 1, the thickness of the light-absorbing film was 207 μm and t1 and t2 of the frame were respectively 0.5 mm (500 μm) and 0.15 mm (150 μm). Accordingly, the ratio of the thickness of the light-absorbing film to t1 was 0.414, and the ratio of the thickness of the light-absorbing film to t2 was 1.38.

Example 2

An optical filter according to Example 2 was produced in the same manner as in Example 1, except that a solution J2 produced under the following conditions was used as the light-absorbing composition instead of the solution J1.

In the optical filter according to Example 2, the thickness of the light-absorbing film was 204 μm, the ratio of the thickness of the light-absorbing film to t1 was 0.408, and the ratio of the thickness of the light-absorbing film to t2 was 1.36.

The solution D1, the solution H1, 8.800 g of a silicone resin (manufactured by Shin-Etsu Chemical Co., Ltd.; product name: KR-300), 0.090 g of an aluminum alkoxide compound (manufactured by Shin-Etsu Chemical Co., Ltd.; product name: CAT-AC), 5.420 g of methyltriethoxysilane (MTES) (manufactured by Shin-Etsu Chemical Co., Ltd.; product name: KBE-13), 2.830 g of tetraethoxysilane (TEOS) (manufactured by KISHIDA CHEMICAL Co., Ltd.; special grade), and 2.448 g of dimethyldiethoxysilane (DMDES) (manufactured by Shin-Etsu Chemical Co., Ltd.; product name: KBE-22) were mixed and then stirred for 30 minutes to obtain the solution J2 being a light-absorbing composition.

Example 3

An optical filter according to Example 3 was produced in the same manner as in Example 1, except that a solution J3 produced under the following conditions was used as the light-absorbing composition instead of the solution J1.

In the optical filter according to Example 3, the thickness of the light-absorbing film was 195 μm, the ratio of the thickness of the light-absorbing film to t1 was 0.390, and the ratio of the thickness of the light-absorbing film to t2 was 1.30.

The solution D1, the solution H1, 8.800 g of a silicone resin (manufactured by Shin-Etsu Chemical Co., Ltd.; product name: KR-300), 0.090 g of an aluminum alkoxide compound (manufactured by Shin-Etsu Chemical Co., Ltd.; product name: CAT-AC), 2.710 g of methyltriethoxysilane (MTES) (manufactured by Shin-Etsu Chemical Co., Ltd.;

product name: KBE-13), 1.415 g of tetraethoxysilane (TEOS) (manufactured by KISHIDA CHEMICAL Co., Ltd.; special grade), and 1.224 g of dimethyldiethoxysilane (DMDES) (manufactured by Shin-Etsu Chemical Co., Ltd.; product name: KBE-22) were mixed and then stirred for 30 minutes to obtain the solution J3 being a light-absorbing composition.

Example 4

An optical filter according to Example 4 was produced in the same manner as in Example 1, except that a solution J4 produced under the following conditions was used as the light-absorbing composition instead of the solution J1.

In the optical filter according to Example 4, the thickness of the light-absorbing film was 220 μm, the ratio of the thickness of the light-absorbing film to t1 was 0.440, and the ratio of the thickness of the light-absorbing film to t2 was 1.47.

The solution D1, the solution H1, 8.800 g of a silicone resin (manufactured by Shin-Etsu Chemical Co., Ltd.; product name: KR-300), 0.090 g of an aluminum alkoxide compound (manufactured by Shin-Etsu Chemical Co., Ltd.; product name: CAT-AC), 9.756 g of methyltriethoxysilane (MTES) (manufactured by Shin-Etsu Chemical Co., Ltd.; product name: KBE-13), 5.732 g of tetraethoxysilane (TEOS) (manufactured by KISHIDA CHEMICAL Co., Ltd.; special grade), and 5.957 g of dimethyldiethoxysilane (DMDES) (manufactured by Shin-Etsu Chemical Co., Ltd.; product name: KBE-22) were mixed and then stirred for 30 minutes to obtain the solution J4 being a light-absorbing composition.

Example 5

An optical filter according to Example 5 was produced in the same manner as in Example 1, except that a solution J5 produced under the following conditions was used as the light-absorbing composition instead of the solution J1.

In the optical filter according to Example 5, the thickness of the light-absorbing film was 218 μm, the ratio of the thickness of the light-absorbing film to t1 was 0.436, and the ratio of the thickness of the light-absorbing film to t2 was 1.45.

An amount of 4.500 g of copper acetate monohydrate and 240 g of tetrahydrofuran (THF) were mixed, and the mixture was stirred for 3 hours to obtain a copper acetate solution. To the obtained copper acetate solution was then added 6.000 g of PLYSURF A219B (manufactured by DKS Co., Ltd.) which is a phosphoric acid ester compound, and the mixture was stirred for 30 minutes to obtain a solution A5. An amount of 40 g of THF was added to 0.710 g of phenylphosphonic acid, and the mixture was stirred for 30 minutes to obtain a solution B5a. An amount of 40 g of THF was added to 4.290 g of 4-bromophenylphosphonic acid, and the mixture was stirred for 30 minutes to obtain a solution B53. Next, the solutions B5a and B53 were mixed, and then stirred for 1 minute. To the solution mixture were added 8.664 g of methyltriethoxysilane (MTES) (manufactured by Shin-Etsu Chemical Co., Ltd., product name: KBE-13) and 2.840 g of tetraethoxysilane (TEOS) (manufactured by KISHIDA CHEMICAL Co., Ltd.; special grade), and the resulting mixture was further stirred for 1 minute to obtain a solution B5. The solution B5 was added to the solution A5 while the solution A5 was stirred, and the mixture was stirred at room temperature for 1 minute. To the resulting solution was then added 60 g of cyclopentanone, and the mixture was stirred at room temperature for 1 minute to obtain a solution C5. The solution C5 was put in a flask and subjected to solvent removal using a rotary evaporator (manufactured by Tokyo Rikakikai Co., Ltd.; product code: N-1110SF) under heating by means of an oil bath (manufactured by Tokyo Rikakikai Co., Ltd.; product code: OSB-2100). The temperature of the oil bath was controlled to 105° C. A solution D5 having undergone the solvent removal was collected from the flask. The solution D5, which was a liquid composition containing aryl-based phosphonic acids and a copper component, was obtained in this manner.

The solution D5, 7.040 g of a silicone resin (manufactured by Shin-Etsu Chemical Co., Ltd.; product name: KR-300), 0.070 g of an aluminum alkoxide compound (manufactured by Shin-Etsu Chemical Co., Ltd.; product name: CAT-AC), 5.420 g of methyltriethoxysilane (MTES) (manufactured by Shin-Etsu Chemical Co., Ltd.; product name: KBE-13), 2.830 g of tetraethoxysilane (TEOS) (manufactured by KISHIDA CHEMICAL Co., Ltd.; special grade), and 2.448 g of dimethyldiethoxysilane (DMDES) (manufactured by Shin-Etsu Chemical Co., Ltd.; product name: KBE-22) were mixed and then stirred for 30 minutes to obtain the solution J5 being a light-absorbing composition.

Example 6

An optical filter according to Example 6 was produced in the same manner as in Example 1, except that a solution J6 produced under the following conditions was used as the light-absorbing composition instead of the solution J1.

In the optical filter according to Example 6, the thickness of the light-absorbing film was 220 μm, the ratio of the thickness of the light-absorbing film to t1 was 0.440, and the ratio of the thickness of the light-absorbing film to t2 was 1.47.

An amount of 4.500 g of copper acetate monohydrate and 240 g of tetrahydrofuran (THF) were mixed, and the mixture was stirred for 3 hours to obtain a copper acetate solution. To the obtained copper acetate solution was then added 3.000 g of PLYSURF A212C (manufactured by DKS Co., Ltd.) which is a phosphoric acid ester compound, and the mixture was stirred for 30 minutes to obtain a solution A6. An amount of 40 g of THF was added to 0.750 g of phenylphosphonic acid, and the mixture was stirred for 30 minutes to obtain a solution B6a. An amount of 40 g of THF was added to 4.490 g of 4-bromophenylphosphonic acid, and the mixture was stirred for 30 minutes to obtain a solution B63. Next, the solutions B6a and B63 were mixed, and then stirred for 1 minute. To the solution mixture were added 8.664 g of methyltriethoxysilane (MTES) (manufactured by Shin-Etsu Chemical Co., Ltd., product name: KBE-13) and 2.840 g of tetraethoxysilane (TEOS) (manufactured by KISHIDA CHEMICAL Co., Ltd.; special grade), and the resulting mixture was further stirred for 1 minute to obtain a solution B6. The solution B6 was added to the solution A6 while the solution A6 was stirred, and the mixture was stirred at room temperature for 1 minute. To the resulting solution was then added 60 g of cyclopentanone, and the mixture was further stirred at room temperature for 1 minute to obtain a solution C6. The solution C6 was put in a flask and subjected to solvent removal using a rotary evaporator (manufactured by Tokyo Rikakikai Co., Ltd.; product code: N-1110SF) under heating by means of an oil bath (manufactured by Tokyo Rikakikai Co., Ltd.; product code: OSB-2100). The temperature of the oil bath was controlled to 105° C. A solution D6 having undergone the solvent removal was collected from the flask. The solution D6, which was a liquid composition containing aryl-based phosphonic acids and a copper component, was obtained in this manner.

The solution D6, 7.040 g of a silicone resin (manufactured by Shin-Etsu Chemical Co., Ltd.; product name: KR-300), 0.070 g of an aluminum alkoxide compound (manufactured by Shin-Etsu Chemical Co., Ltd.; product name: CAT-AC), 5.420 g of methyltriethoxysilane (MTES) (manufactured by Shin-Etsu Chemical Co., Ltd.; product name: KBE-13), 2.830 g of tetraethoxysilane (TEOS) (manufactured by KISHIDA CHEMICAL Co., Ltd.; special grade), and 2.448 g of dimethyldiethoxysilane (DMDES) (manufactured by Shin-Etsu Chemical Co., Ltd.; product name: KBE-22) were mixed and then stirred for 30 minutes to obtain the solution J6 being a light-absorbing composition.

Comparative Example 1

An optical filter according to Comparative Example 1 was produced in the same manner as in Example 1, except that a solution J7 produced under the following conditions was used as the light-absorbing composition instead of the solution J1.

In the optical filter according to Comparative Example 1, the thickness of the light-absorbing film was 201 μm, the ratio of the thickness of the light-absorbing film to t1 was 0.402, and the ratio of the thickness of the light-absorbing film to t2 was 1.34.

The solution D1, the solution H1, 8.800 g of a silicone resin (manufactured by Shin-Etsu Chemical Co., Ltd.; product name: KR-300), 0.090 g of an aluminum alkoxide compound (manufactured by Shin-Etsu Chemical Co., Ltd.; product name: CAT-AC) were added, and then stirred for 30 minutes to obtain the solution J7 being a light-absorbing composition.

Tables 1 and 2 show the compounds for the preparation of the light-absorbing compositions according to Examples 1 to 6 and Comparative Example 1 and the added amounts thereof. As shown in these Tables, toluene was used as a solvent in Examples 1 to 4. In Examples 5 and 6, on the other hand, cyclopentanone was used as a solvent. In the case of changing the solvent type, the type of phosphoric acid ester as a dispersant needs to be changed depending on the solvent type because aggregation needs to be prevented in the coating liquid. That is why the phosphoric acid esters different from the phosphoric acid ester used in Examples 1 to 4 were used in Examples 5 and 6. It can be understood that the solvent is desirably selected depending on the chemical resistance of a frame to be included in an optical filter and that a phosphoric acid ester appropriate for the solvent is desirably selected.

Table 3 shows the alkoxysilanes for the preparation of the light-absorbing compositions according to Examples 1 to 6 and Comparative Example 1, total added amounts thereof, solid amounts calculated assuming that the alkoxysilanes have been completely hydrolysis-polycondensed, and ratios thereof.

<Measurement of Transmission Spectrum and Thickness of Light-Absorbing Film>

The light-absorbing films of the optical filters according to Examples 1 to 6 and Comparative Example 1 were measured for transmission spectra at an incident angle of 0° using an ultraviolet-visible-near-infrared spectrophotometer V-670 manufactured by JASCO Corporation. The light-absorbing films of the optical filters were measured for their thicknesses using a laser displacement meter LK-H008 manufactured by Keyence Corporation. The light-absorbing films of the optical filters according to Examples and Comparative Example 1 including the frame α-1 were measured as representatives for their thicknesses. FIGS. 6 to 12 show transmission spectra shown by the optical filters according to Examples 1 to 6 and Comparative Example 1, respectively. Moreover, Table 4 shows transmission properties obtained from these transmission spectra. Furthermore, Table 4 shows the thicknesses of the light-absorbing films of the optical filters.

<Heat Cycle Test>

For each of the optical filters according to Examples 1 to 6 and Comparative Example 1, 5 samples were prepared for each frame type. The prepared 5 samples were subjected to a heat cycle test consisting of 144 cycles. Each cycle includes a period consisting of 30 minutes at 85° C. and 30 minutes at −40° C., and increasing and decreasing the temperature took 5 minutes each in each cycle. A thermal shock tester TSA-103ES manufactured by ESPEC CORP. was used in the heat cycle test. A rating of "B" was given when only one sample of the five samples was broken or peeled. A rating of "C" was given when two or more samples of the five samples were broken or peeled. A rating of "A" was given when all five samples were not broken nor peeled. Table 6 shows the results.

<Young's Modulus and Hardness>

A surface of the light-absorbing film of each optical filter was measured using Nano Indenter XP manufactured by MTS Systems Corporation by nanoindentation (continuous stiffness measurement). The measurement was performed in air and at a room temperature of about 23° C. using a triangular pyramid indenter made of diamond as an indenter. Values of hardness in the indentation depth range of 5 to 10 μm in a hardness-indentation depth diagram obtained by this measurement were averaged to determine the average hardness of the surface of each optical filter. Values of Young's moduli in the indentation depth range of 5 to 10 μm in a Young's modulus-indentation depth diagram obtained by this measurement were averaged to determine the average Young's modulus of each light-absorbing film. As the main component of the light-absorbing film was a silicone resin, the Poisson's ratio of each light-absorbing film was defined as 0.4. Table 4 shows the results.

<Glass-Transition Point>

The light-absorbing film according to Example 1 was subjected to dynamic mechanical analysis (DMA) by forced vibration tensile method. This measurement was performed using RHEOVIBRON DDV-01 FP manufactured by Orientec Corporation under the following conditions.

Test method: forced vibration tensile method (temperature sweep)

Measurement temperature: −40° C. to 95° C.

Temperature increase rate: 2° C./min

Excitation frequency: 1 Hz

Chuck-to-chuck distance: 30 mm

Excitation amplitude: 10 μm

Preload: 4.9 mN

Figure 13:
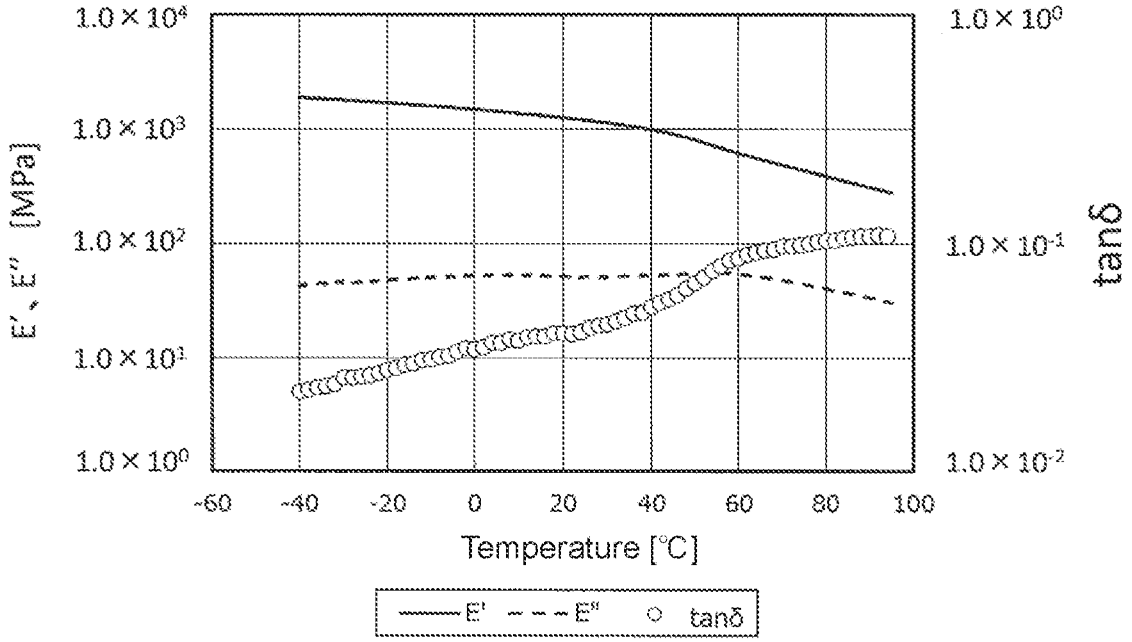
FIG. 13 is a graph showing a relation between a storage modulus E', a loss modulus E", and the temperature and a relation between a loss tangent tan δ and the temperature.

The temperature dependence of a storage modulus E' and a loss modulus E" of the light-absorbing film according to Example 1 was determined from the DMA results. FIG. 13 shows the result. A decrease temperature, which is a temperature at which the hardness starts decreasing, of the storage modulus E' was 50.8° C. The loss modulus E" indicates an energy loss resulting from a micro-Brownian motion accompanying transition, and the peak temperature thereof was 55.4° C. These results reveal that the glass-transition point of the light-absorbing film according to Example 1 is within the range of 50 to 60° C. The glass-transition point in this temperature range is thought to be beneficial because, when the optical filter is exposed to high temperatures or undergoes a thermal cycle, breaking of the light-absorbing film by thermal expansion or thermal shrinkage can be prevented by a flexibility increase associated with a state change of the light-absorbing film. The glass-transition point of the light-absorbing film is desirably in the range of room temperature to 80° C., more desirably in the range of 35° C. to 70° C., and even more desirably in the range of 40° C. to 60° C.

As shown in Table 4, the average Young's moduli of the light-absorbing films of the optical filters according to Examples 1 to 6 were 0.56 GPa to 2.0 GPa. On the other hand, the average Young's modulus of the light-absorbing film of the optical filter according to Comparative Example 1 was 2.6 GPa. These results suggest that the light-absorbing films of the optical filters of Examples 1 to 6 have desired flexibilities and that the flexibility of the light-absorbing film of the optical filter of Comparative Example 1 is inferior to them. It is understood from the contrast between Examples 1 to 6 and Comparative Example 1 that a desired flexibility is likely to be achieved by addition of a particular alkoxysilane to the light-absorbing composition. For example, the flexibility of the light-absorbing film is likely to increase with an increase in the added amount of DMDES. It is understood that a proportion of the added amount of DMDES calculated as solids to the total solids of the alkoxysilanes is preferably 10% or more on a mass basis and that the flexibility of the light-absorbing film can be improved by increasing the proportion in the range of 10 to 24%. Meanwhile, in the light-absorbing film of each optical filter, the added amount of TEOS calculated as solids is about 20% of the total solids of the alkoxysilanes on a mass basis. While TEOS imparts strength to the light-absorbing film, an increase in the proportion of TEOS in the light-absorbing film can cause breaking or cracking in the process of or after production of the light-absorbing film. Therefore, the added amount of TEOS calculated as solids is desirably 50% or less, and more desirably 35% or less, of the total solids of the alkoxysilanes on a mass basis. It is also possible to improve the flexibility by increasing the added amount of the phosphoric acid ester being a component other than the silane monomers. The amount of the phosphoric acid ester in the light-absorbing film of each of the optical filters according to Examples 5 and 6 is greater than the amount of the phosphoric acid ester in the light-absorbing film of each of the optical filters according to Examples 1 to 4. It is understood that these contributed to the decreased Young's moduli of the light-absorbing films.

As shown in Table 6, peeling or breaking of the light-absorbing film was confirmed in some samples. The optical filters according to Examples 1 to 6 exhibited good results in the heat cycle test. On the other hand, in the heat cycle test for the optical filter according to Comparative Example 1, a defect such as peeling or breaking of the light-absorbing film occurred. It is inferred that since the light-absorbing compositions for the light-absorbing films of the optical filters according to Examples 1 to 6 include DMDES, in which two organic functional groups are bonded to one silicon atom, the coefficients of thermal expansion of the light-absorbing films are relatively high. However, the results of the heat cycle test were favorable presumably because the light-absorbing films were flexible enough to exhibit durability against warpage attributed to the difference between the coefficient of thermal expansion of the frame and that of the light-absorbing film. On the other hand, it is thought that Comparative Example 1 had an insufficient durability against warpage caused by a temperature variation although the higher Young's modulus suggests a high stiffness.

It is thought that breaking and peeling of the light-absorbing film can be prevented by making the coefficient of thermal expansion of the frame and that of the light-absorbing film closer to each other. However, it has been revealed that in the case where the entire periphery of the light-absorbing film is fixed to the frame, the properties of the light-absorbing film need to be adjusted instead of the difference between the coefficient of thermal expansion of the frame and that of the light-absorbing film. This is suggested by the fact that the results of the heat cycle test of the optical filters using three types of frames having different expansion coefficients are almost independent of the frame types.

According to the results for the optical filters according to Examples, controlling the average Young's modulus of the light-absorbing film to 0.56 GPa to 2.0 GPa is particularly advantageous from the viewpoint of achieving a high resistance to a temperature variation. Additionally, it is understood that using a frame made of a material having an average coefficient of linear expansion of $4.7\times10^{-5}$ to $12.5\times10^{-5}$ [/° C.] in the range of 0° C. to 60° C. is particularly important from the viewpoint of achieving an optical filter having a high resistance to a temperature variation.

TABLE 1

| | Liquid composition containing aryl-based phosphonic acids and copper component and added amounts of each component [g] | | | | | | | | | | |
|---|---|---|---|---|---|---|---|---|---|---|---|
| | Copper acetate | THF | Phosphoric acid ester A208N | Phosphoric acid ester A219B | Phosphoric acid ester A212C | Phenyl-phosphonic acid | Bromophenyl-phosphonic acid | Alkoxysilane MTES | Alkoxysilane TEOS | Toluene | Cyclopentanone |
| Example 1 | 4.500 | 320 | 1.646 | 0 | 0 | 0.706 | 4.230 | 8.664 | 2.840 | 100 | 0 |
| Example 2 | 4.500 | 320 | 1.646 | 0 | 0 | 0.706 | 4.230 | 8.664 | 2.840 | 100 | 0 |
| Example 3 | 4.500 | 320 | 1.646 | 0 | 0 | 0.706 | 4.230 | 8.664 | 2.840 | 100 | 0 |
| Example 4 | 4.500 | 320 | 1.646 | 0 | 0 | 0.706 | 4.230 | 8.664 | 2.840 | 100 | 0 |
| Example 5 | 4.500 | 320 | 0 | 6.000 | 0 | 0.710 | 4.290 | 8.664 | 2.840 | 0 | 60 |
| Example 6 | 4.500 | 320 | 0 | 0 | 3.000 | 0.750 | 4.490 | 8.664 | 2.840 | 0 | 60 |
| Comparative Example1 | 4.500 | 320 | 1.646 | 0 | 0 | 0.706 | 4.230 | 8.664 | 2.840 | 100 | 0 |

TABLE 2

| | Liquid composition containing alkyl-based phosphonic acid and copper component and added amounts of each component [g] | | | | | | Matrix [g] | | | | |
|---|---|---|---|---|---|---|---|---|---|---|---|
| | | | | | | | | Alkoxysilane | | | |
| | Copper acetate | THF | Phosphoric acid ester A208N | n-Butyl-phosphonic acid | Toluene | Cyclopentanone | Silicone resin | MTES | TEOS | DMDES | CAT-AC |
| Example 1 | 1.800 | 140 | 1.029 | 1.154 | 30 | 0 | 8.800 | 10.840 | 5.660 | 4.896 | 0.090 |
| Example 2 | 1.800 | 140 | 1.029 | 1.154 | 30 | 0 | 8.800 | 5.420 | 2.830 | 2.448 | 0.090 |
| Example 3 | 1.800 | 140 | 1.029 | 1.154 | 30 | 0 | 8.800 | 2.710 | 1.415 | 1.224 | 0.090 |
| Example 4 | 1.800 | 140 | 1.029 | 1.154 | 30 | 0 | 8.800 | 9.756 | 5.732 | 5.957 | 0.090 |
| Example 5 | 0 | 0 | 0 | 0 | 0 | 0 | 7.040 | 5.420 | 2.830 | 2.448 | 0.070 |
| Example 6 | 0 | 0 | 0 | 0 | 0 | 0 | 7.040 | 5.420 | 2.830 | 2.448 | 0.070 |
| Comparative Example1 | 1.800 | 140 | 1.029 | 1.154 | 30 | 0 | 8.800 | 0 | 0 | 0 | 0.090 |

TABLE 3

| | Total added amount [g] | | | | Solids [g] | | | | Solid content ratio [%] | | |
|---|---|---|---|---|---|---|---|---|---|---|---|
| | MTES | TEOS | DMDES | Total | MTES | TEOS | DMDES | Total | MTES | TEOS | DMDES |
| Example 1 | 19.504 | 8.500 | 4.896 | 32.900 | 7.362 | 2.462 | 2.448 | 12.272 | 60 | 20 | 20 |
| Example 2 | 14.084 | 5.670 | 2.448 | 22.202 | 5.316 | 1.642 | 1.224 | 8.182 | 65 | 20 | 15 |
| Example 3 | 11.374 | 4.255 | 1.224 | 16.853 | 4.293 | 1.232 | 0.612 | 6.137 | 70 | 20 | 10 |
| Example 4 | 18.420 | 8.572 | 5.957 | 32.949 | 6.953 | 2.482 | 2.979 | 12.414 | 56 | 20 | 24 |
| Example 5 | 14.084 | 5.67 | 2.448 | 22.202 | 5.316 | 1.642 | 1.224 | 8.182 | 65 | 20 | 15 |
| Example 6 | 14.084 | 5.67 | 2.448 | 22.202 | 5.316 | 1.642 | 1.224 | 8.182 | 65 | 20 | 15 |
| Comparative Example1 | 8.664 | 2.840 | 0.000 | 11.504 | 3.270 | 0.822 | 0.000 | 4.093 | 80 | 20 | 0 |

TABLE 4

| | (1) First cut-off wavelength [nm] | (2) Second cut-off wavelength [nm] | (3) Maximum trans-mittance in wave-length range of 300 to 350 nm [%] | (4) Average trans-mittance in wave-length range of 450 to 600 nm [%] | (5) Maximum trans-mittance in wave-length range of 750 to 1000 nm [%] | (6) Maximum trans-mittance in wave length range of 800 to 950 nm [%] | (7) Trans-mittance at wave-length of 1100 nm [%] | Thickness of light-absorbing film [μm] | Average Young's modulus of light-absorbing film [GPa] | Hardness [GPa] |
|---|---|---|---|---|---|---|---|---|---|---|
| Example 1 | 409 | 638 | 0.01 | 87.02 | 0.46 | 0.46 | 0.23 | 207 | 0.74 | 0.018 |
| Example 2 | 408 | 638 | 0.01 | 86.69 | 0.21 | 0.21 | 0.35 | 204 | 1.60 | 0.048 |
| Example 3 | 407 | 642 | 0.01 | 86.99 | 0.36 | 0.23 | 0.55 | 195 | 2.00 | 0.073 |
| Example 4 | 409 | 638 | 0.01 | 86.78 | 0.38 | 0.38 | 0.26 | 220 | 0.56 | 0.014 |
| Example 5 | 408 | 629 | 0.00 | 84.12 | 0.70 | 0.21 | 7.93 | 218 | 1.10 | 0.028 |
| Example 6 | 414 | 623 | 0.01 | 80.94 | 0.89 | 0.33 | 6.00 | 220 | 1.30 | 0.037 |
| Comparative Example1 | 409 | 627 | 0.02 | 84.98 | 0.14 | 0.14 | 0.08 | 201 | 2.62 | 0.11 |

TABLE 5

| | | Average coefficient of linear expansion in the range of 0° C. to 60° C. | Dimensions [mm] | | | | | |
|---|---|---|---|---|---|---|---|---|
| Frame | Material | [/° C.] | A | B | a | b | t1 | t2 |
| α-1 | MC nylon | $10.1 \times 10^{-5}$ | 20 | 15 | 18 | 13 | 0.5 | 0.15 |
| α-2 | (MCA) | | 16 | 12 | 14 | 10 | 0.5 | 0.15 |
| α-3 | | | 12 | 9 | 10 | 7 | 0.5 | 0.15 |

TABLE 5-continued

| | | Average coefficient of linear expansion in the range of 0° C. to 60° C. | Dimensions [mm] | | | | | |
|---|---|---|---|---|---|---|---|---|
| Frame | Material | [/° C.] | A | B | a | b | t1 | t2 |
| β-1 | High- | $12.5 \times 10^{-5}$ | 20 | 15 | 18 | 13 | 0.5 | 0.15 |
| β-2 | strength | | 16 | 12 | 14 | 10 | 0.5 | 0.15 |
| β-3 | MC nylon | | 12 | 9 | 10 | 7 | 0.5 | 0.15 |

TABLE 5-continued

| Frame | Material | Average coefficient of linear expansion in the range of 0° C. to 60° C. [/° C.] | Dimensions [mm] A | B | a | b | t1 | t2 |
|---|---|---|---|---|---|---|---|---|
| | (MCYA) | | | | | | | |
| γ-1 | PPS | $4.7 \times 10^{-5}$ | 20 | 15 | 18 | 13 | 0.5 | 0.15 |
| γ-2 | | | 16 | 12 | 14 | 10 | 0.5 | 0.15 |
| γ-3 | | | 12 | 9 | 10 | 7 | 0.5 | 0.15 |

TABLE 6

| Frame | Example 1 | Example 2 | Example 3 | Example 4 | Example 5 | Example 6 | Comparative Example1 |
|---|---|---|---|---|---|---|---|
| α-1 | A | A | A | A | A | A | C |
| α-2 | A | A | A | A | A | A | C |
| α-3 | A | A | A | A | A | A | C |
| β-1 | A | A | A | A | A | A | C |
| β-2 | A | A | A | A | A | A | C |
| β-3 | A | A | A | A | A | A | B |
| γ-1 | A | A | A | A | A | A | C |
| γ-2 | A | A | A | A | A | A | C |
| γ-3 | A | A | A | A | A | A | C |

The invention claimed is:

1. An optical filter comprising:

a frame, wherein the frame is a flat plate, the frame has a first end face and a second end face as principal surfaces, the frame has a through hole penetrating the frame in a thickness direction thereof, the frame includes a protruding portion protruding toward a central portion of the through hole, and the protruding portion includes a first face substantially parallel to either the first end face or the second end face; and a light-absorbing film including a light-absorbing compound, wherein the light-absorbing film has a first principal surface and a second principal surface, and the light-absorbing film is disposed to close the through hole such that the second principal surface is joined to either the first end face or the second end face at the same level, wherein an average Young's modulus of the light-absorbing film measured by continuous stiffness measurement is 2.5 GPa or less, and a ratio of a thickness of the light-absorbing film to t2 is more than 1 and 2 or less, where t2 is a length in the thickness direction of the frame between the first face and one of the first end face or the second end face joined to the second principal surface.

2. The optical filter according to claim 1, wherein an average coefficient of linear expansion of a material of the frame in a range of 0° C. to 60° C. is $0.2\times10^{-5}$ [/° C.] to $25\times10^{-5}$ [/° C.].

3. The optical filter according to claim 1, wherein the light-absorbing film has a transmission spectrum satisfying the following requirements (I), (II), (III), (IV), (V), (VI), and (VII):

(I) a first cut-off wavelength at which a transmittance is 50% lies in a wavelength range of 380 nm to 440 nm;

(II) a second cut-off wavelength at which a transmittance is 50% lies in a wavelength range of 600 nm to 720 nm;

(III) a maximum transmittance in a wavelength range of 300 nm to 350 nm is 1% or less;

(IV) an average transmittance in a wavelength range of 450 nm to 600 nm is 75% or more;

(V) a maximum transmittance in a wavelength range of 750 nm to 1000 nm is 5% or less;

(VI) a maximum transmittance in a wavelength range of 800 nm to 950 nm is 4% or less; and (VII) a transmittance at a wavelength of 1100 nm is 20% or less.

4. The optical filter according to claim 1, wherein the light-absorbing film has a thickness of 1 μm to 1000 μm.

5. An imaging apparatus comprising:

an imaging device;

a lens configured to allow transmission of light from a subject and collect light to the imaging device; and the optical filter according to claim 1.

6. An optical filter manufacturing method, comprising:

providing a frame that is a flat plate having a first end face and a second end face as principal surfaces, the frame having a through hole penetrating the frame in a thickness direction thereof, and the frame including a protruding portion protruding toward a central portion of the through hole, the protruding portion including a first face substantially parallel to either the first end face or the second end face;

supplying a light-absorbing composition including a light-absorbing compound into the through hole of the frame; and curing the light-absorbing composition to form a light-absorbing film having a first principal surface and a second principal surface, wherein the second principal surface is joined to either the first end face or the second end face at the same level, an average Young's modulus of the light-absorbing film measured by continuous stiffness measurement is 2.5 GPa or less, and a ratio of a thickness of the light-absorbing film to t2 is more than 1 and 2 or less, where t2 is a length in the thickness direction of the frame between the first face and one of the first end face or the second end face joined to the second principal surface.

7. The optical filter according to claim 1, wherein the average Young's modulus of the light-absorbing film is 0.1 GPa or more.

8. The optical filter according to claim 1, wherein the light-absorbing film has a hardness of 0.005 GPa to 0.06 GPa.

9. The optical filter according to claim 1, wherein the frame includes a material selected from the group consisting of a metallic material, a resin, a ceramic, and a composite material.

10. The optical filter according to claim 1, wherein the frame has a thickness t1 of 0.2 mm to 2 mm.

* * * * *